United States Patent
Matsumoto et al.

(10) Patent No.: US 9,560,706 B2
(45) Date of Patent: Jan. 31, 2017

(54) LIGHTENING APPARATUS HAVING MATRIX-ARRANGED LIGHT-EMITTING ELEMENTS

(71) Applicant: Stanley Electric Co., Ltd., Tokyo (JP)

(72) Inventors: Koji Matsumoto, Kawasaki (JP); Mamoru Miyachi, Okegawa (JP); Yasuyuki Shibata, Yokohama (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 14/621,177

(22) Filed: Feb. 12, 2015

(65) Prior Publication Data

US 2015/0245428 A1    Aug. 27, 2015

(30) Foreign Application Priority Data

Feb. 21, 2014 (JP) ................. 2014-031646

(51) Int. Cl.
*H05B 33/08* (2006.01)
*B60Q 1/12* (2006.01)
(Continued)

(52) U.S. Cl.
CPC .......... *H05B 33/083* (2013.01); *B60Q 1/12* (2013.01); *B60Q 1/143* (2013.01); *B60Q 1/1423* (2013.01); *H05B 33/0815* (2013.01); *H05B 33/0827* (2013.01); *H05B 33/0854* (2013.01); *B60Q 2300/054* (2013.01); *B60Q 2300/056* (2013.01); *B60Q 2300/122* (2013.01);
(Continued)

(58) Field of Classification Search
USPC .......................................... 315/81
See application file for complete search history.

(56) References Cited

U.S. PATENT DOCUMENTS 6,362,578 B1*  3/2002  Swanson ........... H05B 33/0815
                                                 315/209 R
8,174,466 B2*  5/2012  Toyomura .......... G09G 3/3233
                                                 315/169.3
(Continued)

FOREIGN PATENT DOCUMENTS

EP      1079361 A1    2/2001
JP      2013-054849 A 3/2013

OTHER PUBLICATIONS

Nov. 11, 2015 Extended European Search Report issued in European Patent Application No. 15155292.4.

*Primary Examiner* — Alexander H Taningco
*Assistant Examiner* — Nelson Correa
(74) *Attorney, Agent, or Firm* — Kenealy Vaidya LLP

(57) ABSTRACT

A lightening apparatus includes light-emitting elements arranged in a matrix. One of the light-emitting elements is located at each intersection between at least two first reference voltage lines and "n" first drive voltage lines. A first reference voltage driver time-divisionally switches the first reference voltage lines. A first drive voltage driver supplies first luminous drive voltages to the first drive voltage lines. One of the light-emitting elements is located at each intersection between at least one second reference voltage line and "n" second drive voltage lines. A second reference voltage driver switches the second reference voltage line. A second drive voltage driver supplies second luminous drive voltages to the second drive voltage lines.

2 Claims, 19 Drawing Sheets

(51) Int. Cl.
 *B60Q 1/14* (2006.01)
 *F21S 8/10* (2006.01)
(52) U.S. Cl.
 CPC ......... *B60Q 2300/41* (2013.01); *F21S 48/115* (2013.01); *F21S 48/1747* (2013.01)

(56) References Cited

U.S. PATENT DOCUMENTS

| | | | | |
|---|---|---|---|---|
| 8,314,558 | B2* | 11/2012 | Dassanayake | F21S 48/1136 315/82 |
| 8,439,536 | B2* | 5/2013 | Sato | F21S 48/1747 362/249.02 |
| 8,564,205 | B2* | 10/2013 | Roberts | B60Q 1/0011 315/294 |
| 8,624,880 | B2* | 1/2014 | Ishiguro | G09G 3/3233 345/204 |
| 2006/0238468 | A1* | 10/2006 | Ishikura | G09G 3/3266 345/83 |
| 2011/0169410 | A1 | 7/2011 | Dassanayake et al. | |
| 2014/0175978 | A1* | 6/2014 | Kobayashi | F21S 48/1195 315/82 |
| 2015/0009693 | A1* | 1/2015 | Sekiguchi | B60Q 1/08 362/465 |

* cited by examiner

FIG. 9A $$d_{on}/(d_{on}+d_{off})$$

|   | 1 | 2 | 3   | 4   | 5   | 6   | 7   | 8 | 9 | 10 | 11 | 12 | 13 | 14 | 15  | 16  | 17  | 18  | 19 | 20 |
|---|---|---|-----|-----|-----|-----|-----|---|---|----|----|----|----|----|-----|-----|-----|-----|----|----|
| A | 0 | 0 | 1   | 1   | 1   | 1   | 1   | 1 | 1 | 1  | 1  | 1  | 1  | 1  | 1   | 1   | 1   | 1   | 0  | 0  |
| B | 0 | 0 | 2/3 | 2/3 | 1   | 1   | 1   | 1 | 1 | 1  | 1  | 1  | 1  | 1  | 1   | 1   | 2/3 | 2/3 | 0  | 0  |
| C | 0 | 0 | 1/4 | 1/4 | 5/8 | 5/8 | 5/8 | 1 | 1 | 1  | 1  | 1  | 1  | 1  | 5/8 | 5/8 | 5/8 | 1/4 | 1/4| 0  | 0 |
| D | 0 | 0 | 1/3 | 1/3 | 1/2 | 1/2 | 1/2 | 1 | 1 | 1  | 1  | 1  | 1  | 1  | 1/2 | 1/2 | 1/2 | 1/3 | 1/3| 0  | 0 |
| E | 0 | 0 | 2/3 | 2/3 | 1   | 1   | 1   | 1 | 1 | 1  | 1  | 1  | 1  | 1  | 1   | 1   | 2/3 | 2/3 | 0  | 0  |

FIG. 9B

|   | 1 | 2 | 3  | 4  | 5  | 6  | 7  | 8   | 9   | 10  | 11  | 12  | 13 | 14 | 15 | 16 | 17 | 18 | 19 | 20 |
|---|---|---|----|----|----|----|----|-----|-----|-----|-----|-----|----|----|----|----|----|----|----|----|
| 1 | 0 | 0 | 20 | 20 | 20 | 20 | 20 | 20  | 20  | 20  | 20  | 20  | 20 | 20 | 20 | 20 | 20 | 20 | 0  | 0  |
| 2 | 0 | 0 | 20 | 20 | 50 | 50 | 50 | 50  | 50  | 50  | 50  | 50  | 50 | 50 | 50 | 50 | 20 | 20 | 0  | 0  |
| 3 | 0 | 0 | 20 | 20 | 50 | 50 | 80 | 80  | 80  | 80  | 80  | 80  | 80 | 50 | 50 | 50 | 20 | 20 | 0  | 0  |
| 4 | 0 | 0 | 20 | 20 | 50 | 50 | 80 | 100 | 100 | 100 | 100 | 100 | 80 | 80 | 50 | 50 | 20 | 20 | 0  | 0  |
| 5 | 0 | 0 | 20 | 20 | 50 | 50 | 50 | 50  | 50  | 50  | 50  | 50  | 50 | 50 | 50 | 50 | 20 | 20 | 0  | 0  |

FIG. 10A $d_{ca}/(d_{ca}+d_{cb})$

|   | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|----|----|----|----|----|----|----|----|----|----|----|
| A | 0 | 0 | 1 | 1 | 1 | 1 | 1 | 1 | 0 | 0 | 0 | 0 | 1 | 1 | 1 | 1 | 1 | 1 | 0 | 0 |
| B | 0 | 0 | 2/8 | 2/8 | 1 | 1 | 1 | 1 | 0 | 0 | 0 | 0 | 1 | 1 | 1 | 1 | 2/8 | 2/8 | 0 | 0 |
| C | 0 | 0 | 1/4 | 1/4 | 5/8 | 5/8 | 5/8 | 1 | 0 | 0 | 0 | 0 | 1 | 5/8 | 5/8 | 5/8 | 1/4 | 1/4 | 0 | 0 |
| D | 0 | 0 | 1/5 | 1/5 | 1/2 | 1/2 | 1/2 | 1 | 1 | 1 | 1 | 1 | 1 | 1/2 | 1/2 | 1/2 | 1/5 | 1/5 | 0 | 0 |
| E | 0 | 0 | 2/8 | 2/8 | 1 | 1 | 1 | 1 | 1 | 1 | 1 | 1 | 1 | 1 | 1 | 1 | 2/8 | 2/8 | 0 | 0 |

FIG. 10B

|   | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|----|----|----|----|----|----|----|----|----|----|----|
| 1 | 0 | 0 | 20 | 20 | 20 | 20 | 20 | 20 | 0 | 0 | 0 | 0 | 20 | 20 | 20 | 20 | 20 | 20 | 0 | 0 |
| 2 | 0 | 0 | 20 | 20 | 50 | 50 | 50 | 50 | 0 | 0 | 0 | 0 | 50 | 50 | 50 | 50 | 20 | 20 | 0 | 0 |
| 3 | 0 | 0 | 20 | 20 | 50 | 50 | 50 | 80 | 0 | 0 | 0 | 0 | 80 | 50 | 50 | 50 | 20 | 20 | 0 | 0 |
| 4 | 0 | 0 | 20 | 20 | 50 | 50 | 100 | 100 | 100 | 100 | 100 | 100 | 100 | 50 | 50 | 50 | 20 | 20 | 0 | 0 |
| 5 | 0 | 0 | 20 | 20 | 50 | 50 | 50 | 50 | 50 | 50 | 50 | 50 | 50 | 50 | 50 | 50 | 20 | 20 | 0 | 0 |

FIG. 11A $d_{xr}/(d_{xr}+d_{xp})$

|   | 1 | 2 | 3 | 4 | 5   | 6   | 7   | 8   | 9   | 10 | 11 | 12 | 13 | 14 | 15 | 16  | 17  | 18  | 19  | 20  |
|---|---|---|---|---|-----|-----|-----|-----|-----|----|----|----|----|----|----|-----|-----|-----|-----|-----|
| A | 0 | 0 | 0 | 0 | 1   | 1   | 1   | 1   | 1   | 1  | 1  | 1  | 1  | 1  | 1  | 1   | 1   | 1   | 1   | 1   |
| B | 0 | 0 | 0 | 0 | 2/3 | 2/3 | 1   | 1   | 1   | 1  | 1  | 1  | 1  | 1  | 1  | 1   | 1   | 1   | 2/3 | 2/3 |
| C | 0 | 0 | 0 | 0 | 1/4 | 1/4 | 5/8 | 5/8 | 5/8 | 1  | 1  | 1  | 1  | 1  | 1  | 5/8 | 5/8 | 5/8 | 1/4 | 1/4 |
| D | 0 | 0 | 0 | 0 | 1/5 | 1/5 | 1/2 | 1/2 | 1/2 | 1  | 1  | 1  | 1  | 1  | 1  | 1/2 | 1/2 | 1/2 | 1/5 | 1/5 |
| E | 0 | 0 | 0 | 0 | 2/3 | 2/3 | 1   | 1   | 1   | 1  | 1  | 1  | 1  | 1  | 1  | 1   | 1   | 1   | 2/3 | 2/3 |

FIG. 11B

|   | 1 | 2 | 3 | 4 | 5  | 6  | 7  | 8  | 9  | 10  | 11  | 12  | 13  | 14  | 15 | 16 | 17 | 18 | 19 | 20 |
|---|---|---|---|---|----|----|----|----|----|-----|-----|-----|-----|-----|----|----|----|----|----|----|
| 1 | 0 | 0 | 0 | 0 | 25 | 25 | 25 | 25 | 25 | 25  | 25  | 25  | 25  | 25  | 25 | 25 | 25 | 25 | 25 | 25 |
| 2 | 0 | 0 | 0 | 0 | 25 | 25 | 50 | 50 | 50 | 50  | 50  | 50  | 50  | 50  | 50 | 50 | 50 | 50 | 25 | 25 |
| 3 | 0 | 0 | 0 | 0 | 25 | 25 | 50 | 50 | 50 | 80  | 80  | 80  | 80  | 80  | 80 | 50 | 50 | 50 | 25 | 25 |
| 4 | 0 | 0 | 0 | 0 | 25 | 25 | 50 | 50 | 50 | 100 | 100 | 100 | 100 | 100 | 80 | 50 | 50 | 50 | 25 | 25 |
| 5 | 0 | 0 | 0 | 0 | 25 | 25 | 50 | 50 | 50 | 50  | 50  | 50  | 50  | 50  | 50 | 50 | 50 | 50 | 25 | 25 |

FIG. 12A $d_{on}/(d_{on}+d_{off})$

|   | 1 | 2 | 3 | 4 | 5   | 6   | 7   | 8   | 9   | 10 | 11 | 12 | 13 | 14 | 15 | 16  | 17  | 18  | 19  | 20  |
|---|---|---|---|---|-----|-----|-----|-----|-----|----|----|----|----|----|----|-----|-----|-----|-----|-----|
| A | 0 | 0 | 0 | 0 | 1   | 1   | 1   | 1   | 1   | 1  | 0  | 0  | 0  | 0  | 1  | 1   | 1   | 1   | 1   | 1   |
| B | 0 | 0 | 0 | 0 | 2/3 | 2/3 | 1   | 1   | 1   | 1  | 0  | 0  | 0  | 0  | 1  | 1   | 1   | 1   | 2/3 | 2/3 |
| C | 0 | 0 | 0 | 0 | 1/4 | 1/4 | 5/8 | 5/8 | 5/8 | 1  | 0  | 0  | 0  | 0  | 1  | 5/8 | 5/8 | 5/8 | 1/4 | 1/4 |
| D | 0 | 0 | 0 | 0 | 1/6 | 1/6 | 1/2 | 1/2 | 1/2 | 1  | 1  | 1  | 1  | 1  | 1  | 1/2 | 1/2 | 1/2 | 1/6 | 1/6 |
| E | 0 | 0 | 0 | 0 | 2/3 | 2/3 | 1   | 1   | 1   | 1  | 1  | 1  | 1  | 1  | 1  | 1   | 1   | 1   | 2/3 | 2/3 |

FIG. 12B

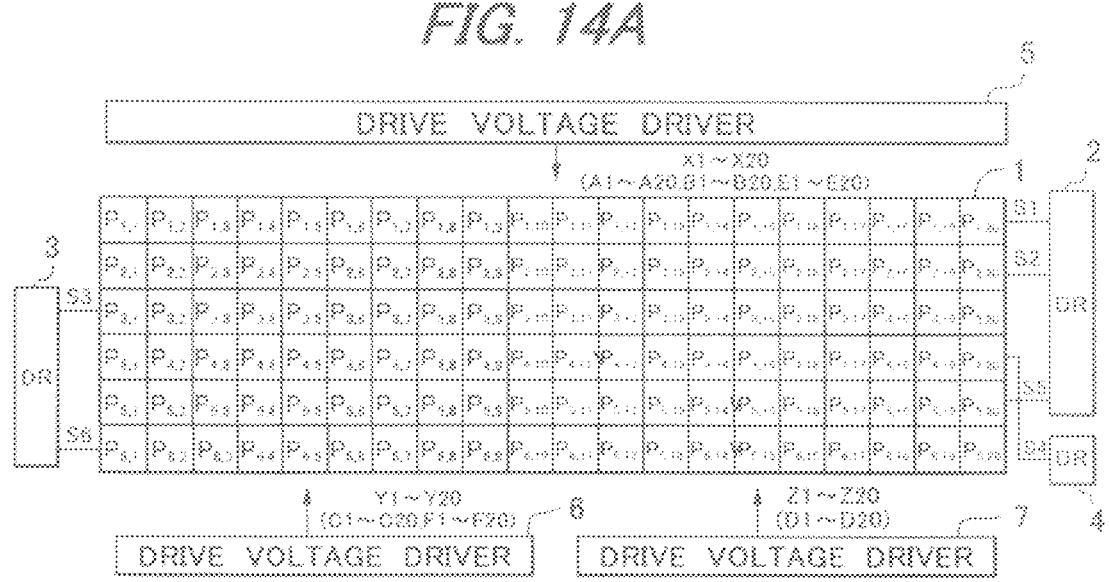

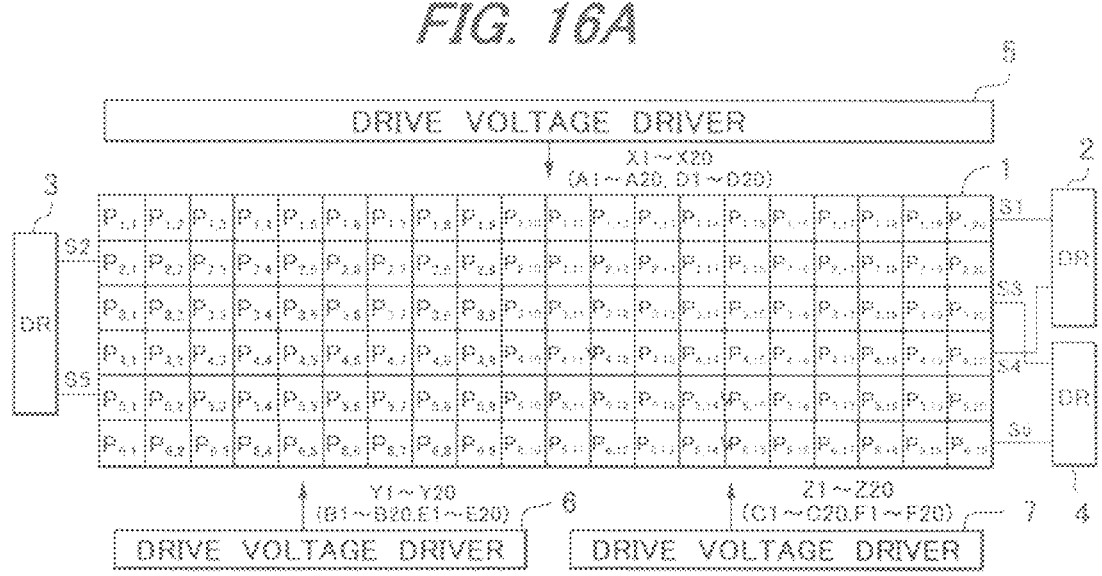

LIGHTENING APPARATUS HAVING MATRIX-ARRANGED LIGHT-EMITTING ELEMENTS

This application claims the priority benefit under 35 U.S.C. §119 to Japanese Patent Application No. JP2014-031646 filed on Feb. 21, 2014, which disclosure is hereby incorporated in its entirety by reference.

BACKGROUND

Field

The presently disclosed subject matter relates to a lightening apparatus having a plurality of light-emitting elements such as light-emitting diode (LED) elements and organic or inorganic electro-luminescence (EL) elements arranged in a matrix.

Description of the Related Art

Conventionally, a lightening apparatus formed by LED elements arranged in a matrix including "m" rows and "n" columns has been used as a vehicle headlamp. In such a lightening apparatus, luminous intensities of the LED elements are individually controlled to realize an adaptive drive beam (ADB) and an adaptive front-lighting system (AFS) (see: JP2013-54849A).

For driving the conventional lightening apparatus, there are two driving methods: a static driving method and a dynamic driving method.

In the static driving method, all cathode electrodes of the LED elements are commonly grounded, while there are a plurality of luminous drive voltage lines each connected to one of the LED elements. Thus, the luminous intensities of the LED elements can individually be controlled.

In the static driving method, however, a large number of voltage lines, i.e., "m×n" voltage lines are required, which would increase the lightening apparatus in size.

On the other hand, in the dynamic driving method, there are "m" reference voltage lines each connected to all the cathode electrodes of the LED elements belonging to one row, and "n" drive voltage lines each connected to the LED elements belonging to one column. That is, only a small number of voltage lines, i.e., only (m+n) voltage lines are required, which would decrease the lightening apparatus in size as compared with those of the static driving method.

In the dynamic driving method, however, since the rows of the LED elements are time-divisionally driven, when the number of rows of the LED elements is increased, the luminous period of the LED elements is decreased, which would decrease the luminous intensity.

SUMMARY

The presently disclosed subject matter seeks to solve one or more of the above-described problems.

According to the presently disclosed subject matter, a lightening apparatus includes a plurality of light-emitting elements arranged in a matrix having "m" rows, "n" columns where "m" is an integer larger than 2 and "n" is a positive integer, at least two first reference voltage lines, and "n" first drive voltage lines. One of the light-emitting elements is located at each intersection between the first reference voltage lines and the first drive voltage lines. A first reference voltage driver is connected to the first reference voltage lines and adapted to time-divisionally switch the first reference voltage lines. A first drive voltage driver is connected to the first drive voltage lines and adapted to supply first luminous drive voltages to the first drive voltage lines in synchronization with time-divisional switching of the first reference voltage lines. At least one second reference voltage line and "n" second drive voltage lines are provided. One of the light-emitting elements is located at each intersection between the second reference voltage line and the second drive voltage lines. A second reference voltage driver is connected to the second reference voltage line and adapted to switch the second reference voltage line. A second drive voltage driver is connected to the second drive voltage lines and adapted to supply second luminous drive voltages to the second drive voltage lines in synchronization with switching of the second reference voltage line.

The first reference voltage driver is operated by a dynamic driving method, and the second reference voltage driver is operated by either a dynamic driving method or a static driving method.

According to the presently disclosed subject matter, even when the number of rows of the light-emitting elements is increased, the luminous intensity would not be decreased.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIG. 9A is a diagram showing a first example of the on-duty ratios of the luminous drive voltages of FIG. 1;

FIG. 9B is a diagram showing the luminous intensities of the LED elements obtained by the luminous drive voltages of FIG. 9A;

FIG. 10A is a diagram showing a second example of the on-duty ratios of the luminous drive voltages of FIG. 1;

FIG. 10B is a diagram showing the luminous intensities of the LED elements obtained by the luminous drive voltages of FIG. 10A;

FIG. 11A is a diagram showing a third example of the on-duty ratios of the luminous drive voltages of FIG. 1;

FIG. 11B is a diagram showing the luminous intensities of the LED elements obtained by the luminous drive voltages of FIG. 11A;

FIG. 12A is a diagram showing a fourth example of the on-duty ratios of the luminous drive voltages of FIG. 1;

FIG. 12B is a diagram showing the luminous intensities of the LED elements obtained by the luminous drive voltages of FIG. 12A;

FIG. 14A is a block circuit diagram illustrating a third embodiment of the lightening apparatus according to the presently disclosed subject matter;

FIG. 14B is a diagram for explaining the maximum luminous intensities of the LED elements of FIG. 14A;

FIG. 16A is a block circuit diagram illustrating a fourth embodiment of the lightening apparatus according to the presently disclosed subject matter;

FIG. 16B is a diagram for explaining the maximum luminous intensities of the LED elements of FIG. 16A;

DETAILED DESCRIPTION OF EXEMPLARY EMBODIMENTS

Figure 1:
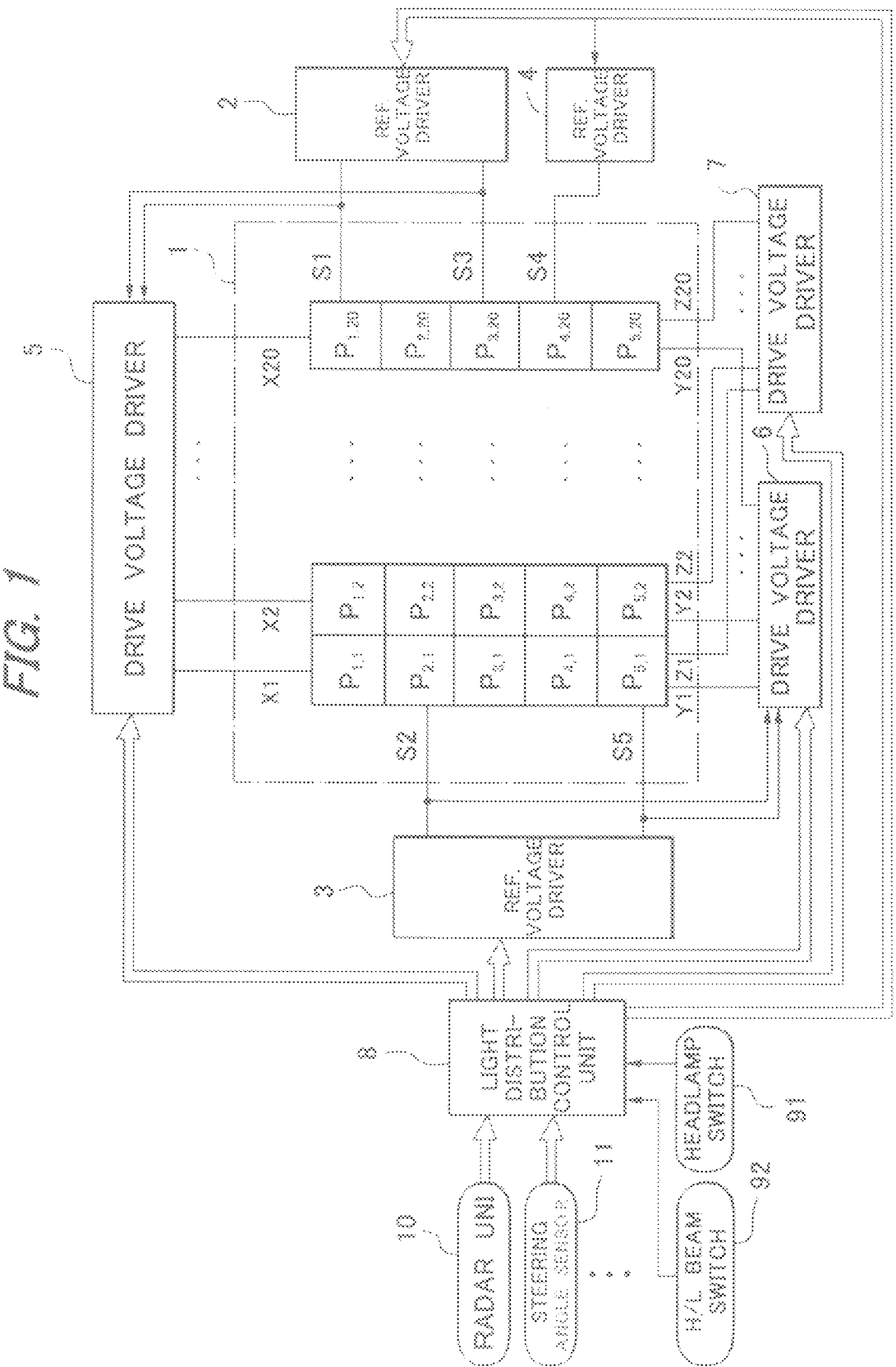
FIG. 1 is a block circuit diagram illustrating a first embodiment of the lightening apparatus according to the presently disclosed subject matter.

In FIG. 1, which illustrates a first embodiment of the lightening apparatus according to the presently disclosed subject matter, the lightening apparatus, that is mounted on a vehicle, includes an LED panel 1, reference voltage drivers 2, 3 and 4 for supplying reference voltages such as the ground voltage GND to the LED panel 1, drive voltage drivers 5, 6 and 7 for supplying drive voltages to drive voltage lines X1, X2, . . . , X20; Y1, Y2, . . . , Y20; and Z1, Z2, . . . , Z20 of the LED panel 1, a light distribution control unit 8 for receiving various sense signals such as signals from a headlamp switch 91, a high/low beam switch 92, a radar unit 10, a steering angle sensor 11, and the like directly or indirectly through other control units to control the reference voltage drivers 2, 3 and 4 and the drive voltage drivers 5, 6 and 7. The light distribution control unit 8 is constructed by a microcomputer. Thus, various light distribution patterns can be realized at the LED panel 1.

Figure 2:
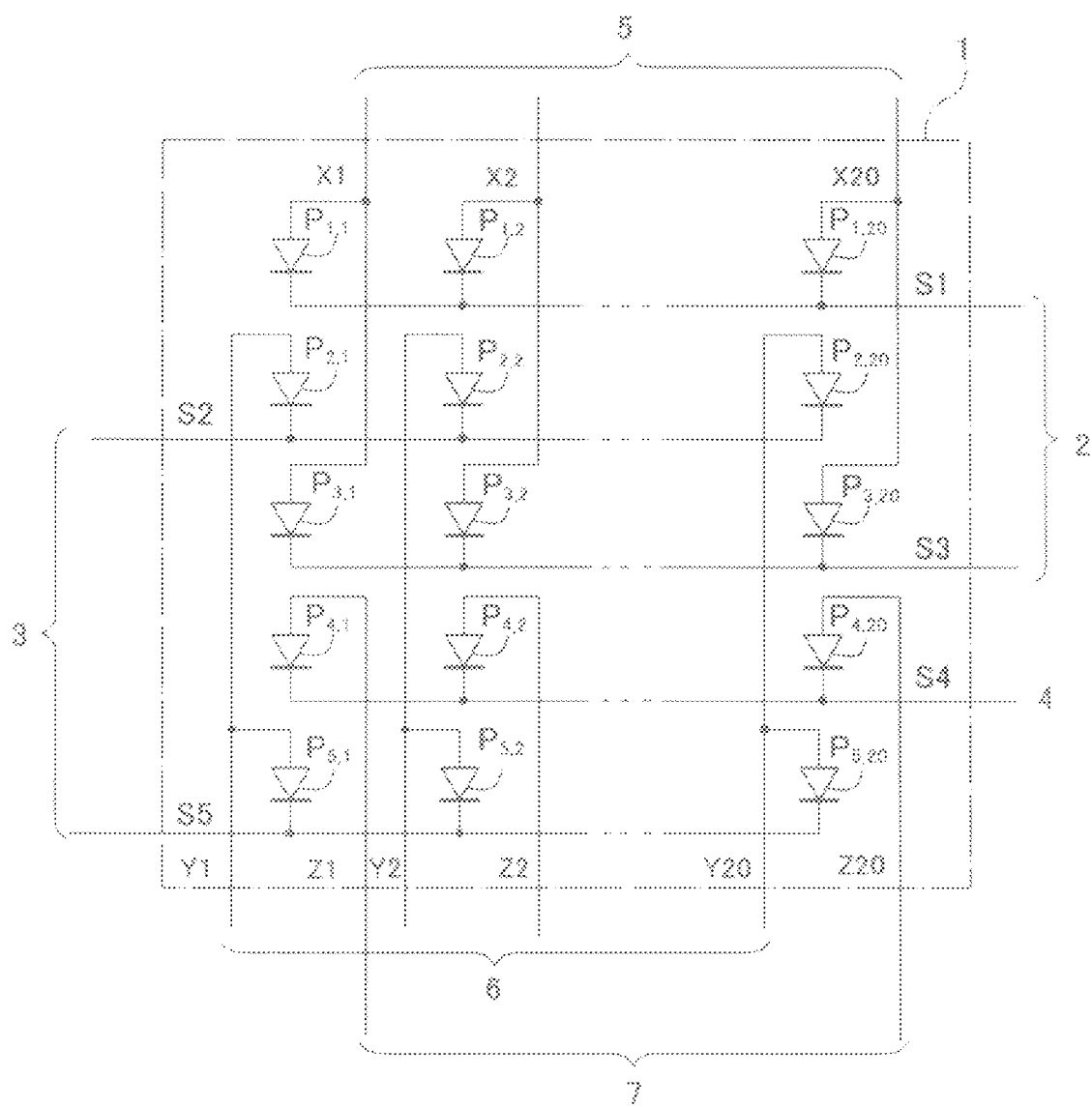
FIG. 2 is a circuit diagram of the LED panel of FIG. 1.

The LED panel 1 includes LED elements $P_{1,1}$, $P_{1,2}$, . . . , $P_{1,20}$; $P_{2,1}$, $P_{2,2}$, . . . , $P_{2,20}$; . . . ; $P_{5,1}$, $P_{5,2}$, . . . , $P_{5,20}$ in five rows, twenty columns. In more detail, as illustrated in FIG. 2, the LED elements $P_{1,1}$, $P_{1,2}$, . . . , $P_{1,20}$ belonging to the first row have cathode electrodes commonly connected to a reference voltage line S1, and anode electrodes connected to the drive voltage lines X1, X2, . . . , X20, respectively. Also, the LED elements $P_{2,1}$, $P_{2,2}$, . . . , $P_{2,20}$ belonging to the second row have cathode electrodes commonly connected to a reference voltage line S2, and anode electrodes connected to the drive voltage lines Y1, Y2, . . . , Y20, respectively. Further, the LED elements $P_{3,1}$, $P_{3,2}$, . . . , $P_{3,20}$ belonging to the third row have cathode electrodes commonly connected to a reference voltage line S3, and anode electrodes connected to the drive voltage lines X1, X2, . . . X20, respectively. Further, the LED elements $P_{4,1}$, $P_{4,2}$, . . . , $P_{4,20}$ belonging to the fourth row have cathode electrodes commonly connected to a reference voltage line S4, and anode electrodes connected to the drive voltage lines Z1, Z2, . . . , Z20, respectively. Furthermore, the LED elements $P_{5,1}$, $P_{5,2}$, . . . , $P_{5,20}$ belonging to the fifth row have cathode electrodes commonly connected to a reference voltage line S5, and anode electrodes connected to the drive voltage lines Y1, Y2, . . . , Y20, respectively.

That is, the anode electrodes of the LED elements $P_{1,1}$, $P_{1,2}$, . . . , $P_{1,20}$ for the first row and the anode electrodes of the LED elements $P_{3,1}$, $P_{3,2}$, . . . , $P_{3,20}$ for the third row are commonly connected to the drive voltage lines X1, X2, . . . , X20. Also, the anode electrodes of the LED elements $P_{2,1}$, $P_{2,2}$, . . . , $P_{2,20}$ for the second row and the anode electrodes of the LED elements $P_{5,1}$, $P_{5,2}$, . . . , $P_{5,20}$ for the fifth row are commonly connected to the drive voltage lines Y1, Y2, . . . , Y20.

Figure 3:
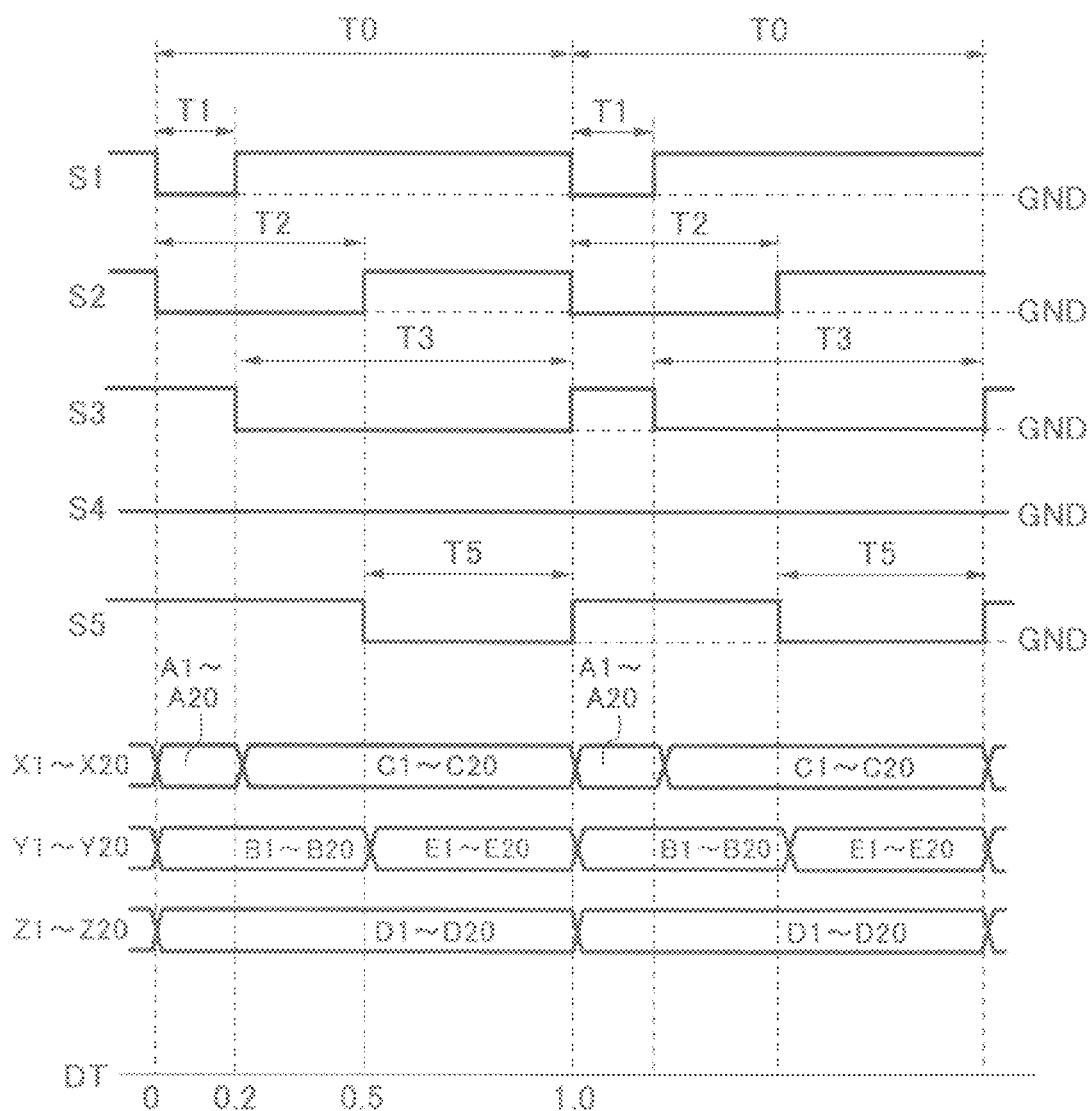
FIG. 3 is a timing diagram for explaining the operation of the lightening apparatus of FIG. 1.

The reference voltage driver 2 is a multiplexing switching circuit which time-divisionally activates or switches the reference voltage lines S1 and S3 with a luminous period ratio of T1:T3=20:80 as illustrated in FIG. 3 where one entire period T0=T1+T3 and each of the activated reference voltages is the ground voltage GND. Simultaneously, the drive voltage driver 5 is operated in synchronization with the time-divisional switching of the reference voltage lines S1 and S3. That is, the drive voltage driver 5 is driven by the voltage at the reference voltage line S1, so that the drive voltage driver 5 generates pulse-shaped luminous drive voltages A1, A2, . . . , A20 defined by their on-duty ratios for the first row during the luminous period T1, i.e., voltage at X1=A1
voltage at X2=A2
. . .
voltage at X20=A20.

Also, the drive voltage driver 5 is driven by the voltage at the reference voltage line S3, so that the drive voltage driver 5 generates pulse-shaped luminous drive voltages C1, C2, . . . , C20 defined by their on-duty ratios for the third row during the luminous period T3, i.e., voltage at X1=C1
voltage at X2=C2
. . .
voltage at X20=C20.

Thus, the LED elements $P_{1,1}$, $P_{1,2}$, . . . , $P_{1,20}$ for the first row and the LED elements $P_{3,1}$, $P_{3,2}$, . . . , $P_{3,20}$ for the third row are time-divisionally driven by a dynamic driving method.

The reference voltage driver 3 is a multiplexing switching circuit which time-divisionally activates or switches the reference voltage lines S2 and S5 with a luminous period ratio of T2:T5=50:50 as illustrated in FIG. 3 where T0=T2+T5 and each of the activated reference voltages is the ground voltage GND. Simultaneously, the drive voltage driver 6 is operated in synchronization with the time-divisional switching of the reference voltage lines S2 and S5. That is, the drive voltage driver 6 is driven by the voltage at the reference voltage line S2, so that the drive voltage driver 6 generates pulse-shaped luminous drive voltages B1, B2, . . . , B20 defined by their on-duty ratios for the second row during the luminous period T2, i.e., voltage at Y1=B1
voltage at Y2=B2
. . .
voltage at Y20=B20.

Also, the drive voltage driver 6 is driven by the voltage at the reference voltage line S5, so that the drive voltage driver 6 generates pulse-shaped luminous drive voltages E1, E2, . . . , E20 defined by their on-duty ratios for the fifth row during the luminous period T5, i.e., voltage at Y1=E1
voltage at Y2=E2
. . .
voltage at Y20=E20.

Thus, the LED elements $P_{2,1}, P_{2,2}, \ldots, P_{2,20}$ for the second row and the LED elements $P_{5,1}, P_{5,2}, \ldots, P_{5,20}$ for the fifth row are time-divisionally driven by a dynamic driving method.

The reference voltage driver 4 is a simple switching circuit which activates or switches the reference voltage line S4 over the entire luminous period T0 as illustrated in FIG. 3 where the activated reference voltage is the ground voltage GND. In this case, the drive voltage driver 7 generates pulse-shaped luminous drive voltages D1, D2, . . . , D20 defined by their on-duty ratios for the fourth row during the entire luminous period T0, i.e., voltage at Z1=D1
voltage at Z2=D2
. . .
voltage at Z20=D20.

Thus, the LED elements $P_{4,1}, P_{4,2}, \ldots, P_{4,20}$ for the fourth row are driven by a static driving method.

In FIG. 3, note that DT designates a duty ratio.

Figure 4A:
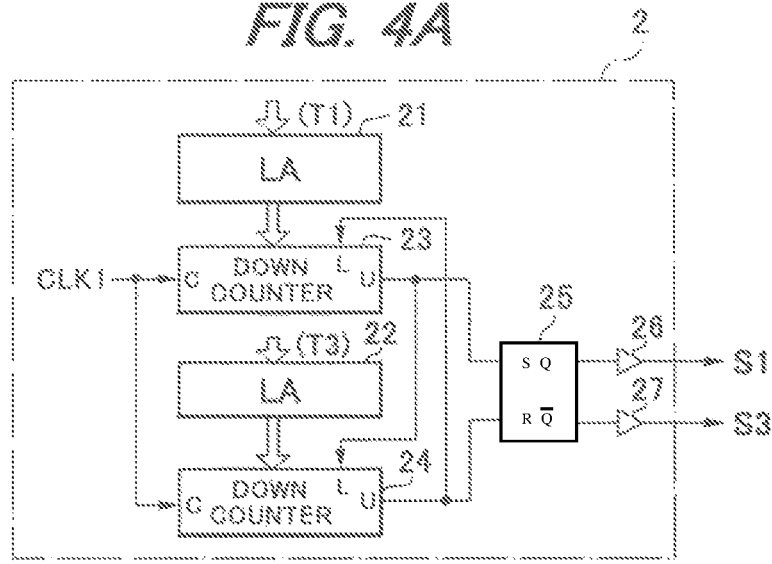
FIGS. 4A, 4B and 4C are block circuit diagrams of the reference voltage drivers of FIG. 1.

In FIG. 4A, which is a block circuit diagram of the reference voltage driver 2 of FIG. 1, the reference voltage driver 2 is constructed by a pulse width modulation (PWM) circuit which includes latch circuits 21 and 22, down counters 23 and 24, an RS-type flip-flop 25, and output amplifiers 26 and 27 for generating voltages at the reference voltage lines S1 and S3.

When the PWM circuit of FIG. 4A is activated by the light distribution control unit 8, first, duty ratio values corresponding to the luminous periods T1 and T3 are preset in the latch circuits 21 and 22, respectively. Then, a load signal (not shown) may initially be supplied to the load terminal L of the down counter 23, so that the duty ratio value of the latch circuit 21 is loaded in the down counter 23. Then, the clock terminal C of the down counter 23 receives a clock signal CLK1 supplied from the light distribution control unit 8, so that the content of the down counter 23 is decremented by 1 in response to each pulse of the clock signal CLK1. When the down counter 23 underflows to generate an underflow signal from its underflow terminal U, the RS-type flip-flop 25 is set, so that the voltage at the reference voltage line S1 rises and the voltage at the reference voltage line S3 falls. Simultaneously, the duty ratio value of the latch circuit 22 is loaded by the underflow signal of the down counter 23 in the down counter 24. Then, the clock terminal C of the down counter 24 receives the clock signal CLK1 supplied from the light distribution control unit 8, so that the content of the down counter 24 is decremented by 1 in response to each pulse of the clock signal CLK1. When the down counter 24 underflows, to generate an underflow signal from its underflow terminal U, the RS-type flip-flop 25 is reset, so that the voltage at the reference voltage line S1 falls and the voltage at the reference voltage line S3 rises. Simultaneously, the duty ratio value of the latch circuit 21 is again loaded by the underflow signal of the down counter 24 in the down counter 23. Thus, the above-described operations are repeated, so that the voltages at the reference voltage lines S1 and S3 as illustrated in FIG. 3 can be generated.

Figure 4B:
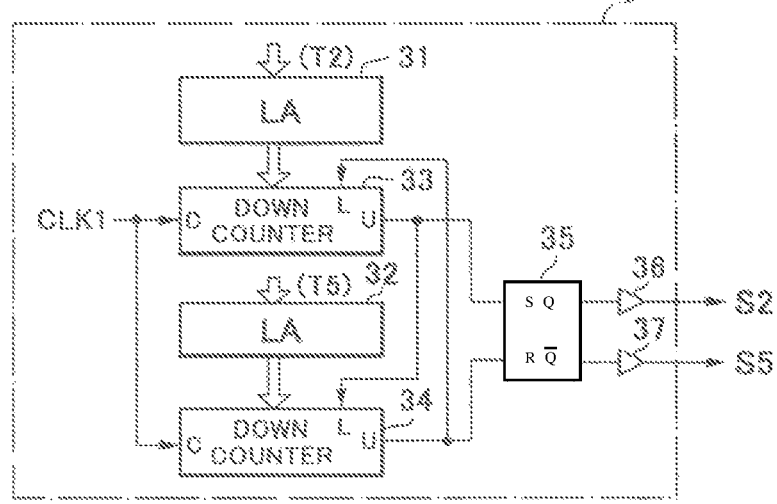

In FIG. 4B, which is a block circuit diagram of the reference voltage driver 3 of FIG. 1, the reference voltage driver 2 is constructed by a PWM circuit which includes latch circuits 31 and 32, down counters 33 and 34, an RS-type flip-flop 35 and output amplifiers 36 and 37 for generating voltages at the reference voltage lines S2 and S5.

In FIGS. 4A and 4B, after the down counters generate underflow signals, the contents thereof are retained at 0.

The operation of the PWM circuit of FIG. 4B is similar to that of the PWM circuit of FIG. 4A. Thus, the voltages at the reference voltage lines S2 and S5 as illustrated in FIG. 3 can be generated.

Figure 4C:
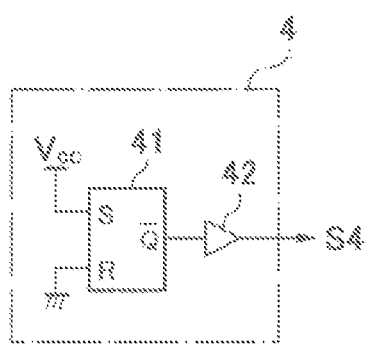

In FIG. 4C, which is a block circuit diagram of the reference voltage driver 4 of FIG. 1, the reference voltage driver 4 is constructed by an RS-type flip-flop 41 and an output amplifier 42 for generating a voltage at the reference voltage line S4. That is, when the reference voltage driver 4 is activated to set the RS-type flip-flop 41, the output amplifier 42 always lowers the voltage at the reference voltage line S4 to the ground voltage GND.

Figure 5A:
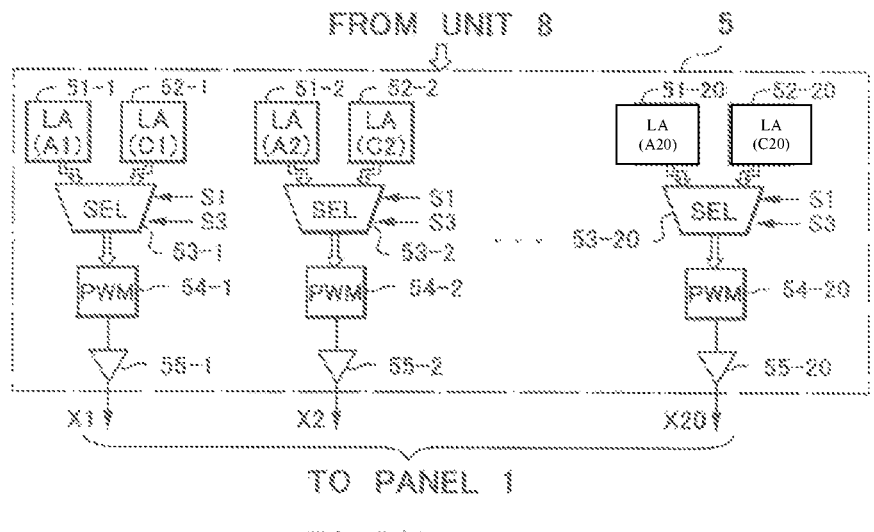
FIGS. 5A, 5B and 5C are block circuit diagrams of the drive voltage drivers of FIG. 1.

In FIG. 5A, which is a block circuit diagram of the drive voltage driver 5 of FIG. 1, the drive voltage driver 5 includes latch circuits 51-1, 51-2, . . . , 51-20 for latching on-duty ratio values of the drive voltages A1, A2, . . . , A20 for the LED elements $P_{1,1}, P_{1,2}, \ldots, P_{1,20}$ of the first row supplied from the light distribution control unit 8, latch circuits 52-1, 52-2, . . . , 52-20 for latching on-duty ratio values of the drive voltages C1, C2, . . . , C20 for the LED elements $P_{3,1}, P_{3,2}, \ldots, P_{3,20}$ of the third row supplied from the light distribution control unit 8, selectors 53-1, 53-2, . . . , 53-20 for selecting the on-duty ratio values of the drive voltages A1, A2, . . . , A20 of the latch circuits 51-1, 51-2, . . . , 51-20 or the on-duty ratio values of the drive voltages C1, C2, . . . , C20 of the latch circuits 52-1, 52-2, . . . , 52-20 in accordance with the voltages at the reference voltage lines S1 and S3, drive voltage generators 54-1, 54-2, . . . , 54-20 for generating the luminous drive voltages A1, A2, . . . , A20 or the luminous drive voltages C1, C2, . . . , C20 using the selected on-duty ratio values, and output amplifiers 55-1, 55-2, . . . , 55-20 for amplifying the luminous drive voltages A1, A2, . . . , A20 or C1, C2, . . . , C20 to transmit them to the drive voltage lines X1, X2, . . . , X20 of the LED panel 1. In this case, the drive voltage generators 54-1, 54-2, . . . , 54-20 are PWM circuits for generating on-duty ratio signals whose duty ratios are determined by the selected on-duty ratio values. Thus, the LED elements $P_{1,1}, P_{1,2}, \ldots, P_{1,20}$ for the first row and the LED elements $P_{3,1}, P_{3,2}, \ldots, P_{3,20}$ for the third row can time-divisionally be operated.

Figure 5B:
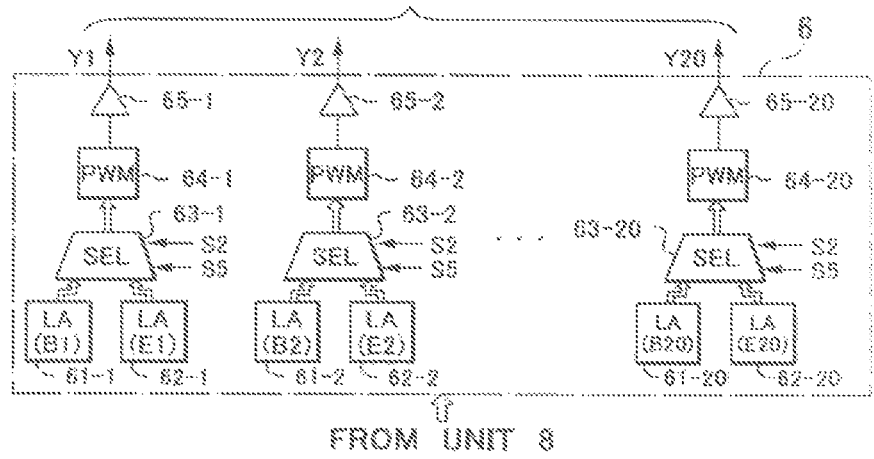

In FIG. 5B, which is a block circuit diagram of the drive voltage driver 6 of FIG. 1, the drive voltage driver 6 includes latch circuits 61-1, 61-2, . . . , 61-20 for latching on-duty ratio values of the drive voltages B1, B2, . . . , B20 for the LED elements $P_{2,1}, P_{2,2}, \ldots, P_{2,20}$ of the second row supplied from the light distribution control unit 8, latch circuits 62-1, 62-2, . . . , 62-20 for latching on-duty ratio values of the drive voltages E1, E2, . . . , E20 for the LED elements $P_{5,1}, P_{5,2}, \ldots, P_{5,20}$ of the fifth row supplied from the light distribution control unit 8, selectors 63-1, 63-2, . . . , 63-20 for selecting the on-duty ratio values of the drive voltages B1, B2, . . . , B20 of the latch circuits 61-1, 61-2, . . . , 61-20 or the on-duty ratio values of the drive voltages E1, E2, . . . , E20 of the latch circuits 62-1, 62-2, . . . , 62-20 in accordance with the voltages at the reference voltage lines S2 and S5, drive voltage generators 64-1, 64-2, . . . , 64-20 for generating the luminous drive voltages B1, B2, . . . , B20 or the luminous drive voltages E1, E2, . . . , E20 using the selected on-duty ratio values, and output amplifiers 65-1, 65-2, . . . , 65-20 for amplifying the luminous drive voltages B1, B2, . . . , B20 or E1, E2, . . . , E20 to transmit them to the drive voltage lines Y1, Y2, ..., Y20 of the LED panel 1. In this case, the drive voltage generators 64-1, 64-2, ..., 64-20 are PWM circuits for generating on-duty ratio signals whose duty ratios are determined by the selected on-duty ratio values. Thus, the LED elements $P_{2,1}, P_{2,2}, \ldots, P_{2,20}$ for the second row and the LED elements $P_{5,1}, P_{5,2}, \ldots, P_{5,20}$ for the fifth row can time-divisionally be operated.

Figure 5C:
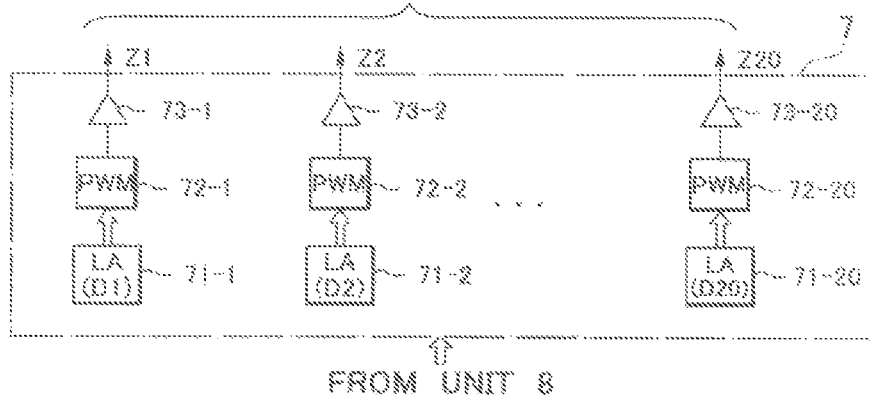

In FIG. 5C, which is a block circuit diagram of the drive voltage driver 7 of FIG. 1, the drive voltage driver 7 includes latch circuits 71-1, 71-2, ..., 71-20 for latching on-duty ratio values of the drive voltages D1, D2, ..., D20 for the LED elements $P_{4,1}, P_{4,2}, \ldots, P_{4,20}$ of the fourth row supplied from the light distribution control unit 8, drive voltage generators 72-1, 72-2, ..., 72-20 for generating the luminous drive voltages D1, D2, ..., D20 using the on-duty ratio values of the latch circuits 71-1, 71-2, ..., 71-20, and output amplifiers 73-1, 73-2, ..., 73-20 for amplifying the luminous drive voltages D1, D2, ..., D20 to transmit them to the drive voltage lines Z1, Z2, ..., Z20 of the LED panel 1. In this case, the drive voltage generators 72-1, 72-2, ..., 72-20 are PWM circuits for generating on-duty ratio signals whose duty ratios are determined by the on-duty ratio values. Thus, the LED elements $P_{4,1}, P_{4,2}, \ldots, P_{4,20}$ for the fourth row can always be operated.

Figure 6:
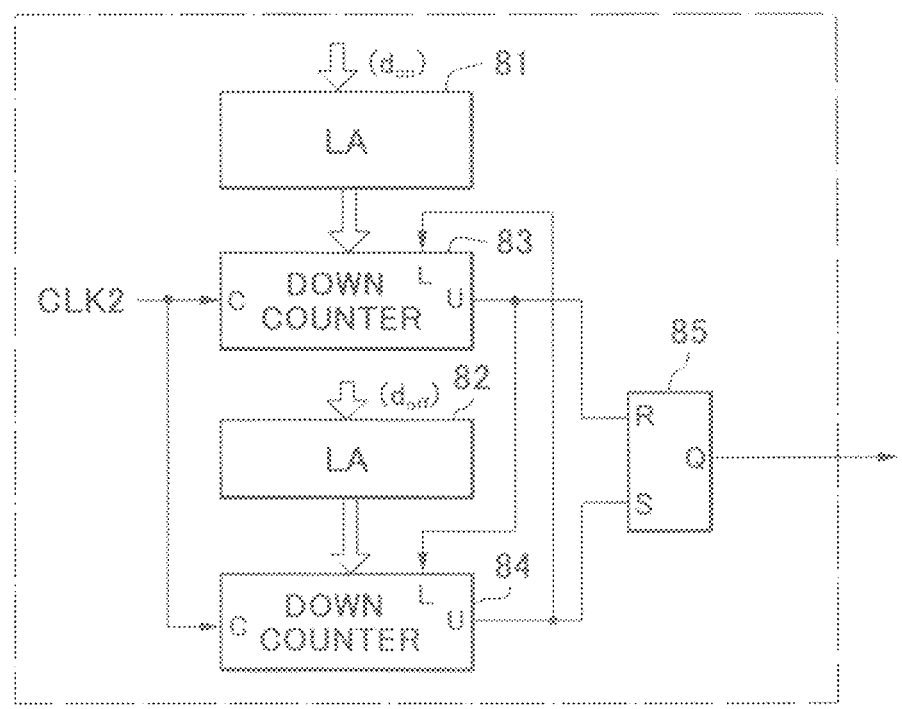
FIG. 6 is a block circuit diagram of the PWM circuit of FIGS. 5A, 5B and 5C.

Each of the PWM circuits 54-1, 54-2, ..., 54-20; 64-1, 64-2, ..., 64-20; and 72-1, 72-2, ..., 72-20 has the same configuration as illustrated in FIG. 6, similar to those of FIGS. 4A and 4B.

In FIG. 6, the PWM circuit includes latch circuits 81 and 82, down counters 83 and 84 and an RS-type flip-flop 85 for generating a voltage at the corresponding drive voltage line.

When the PWM circuit of FIG. 6 is activated by the light distribution control unit 8, first, a duty ratio value $d_{on}$ and an off-duty ratio value $d_{off}$ corresponding to one of the drive voltages are preset in the latch circuits 81 and 82, respectively. Then, a load signal (not shown) may initially be supplied to the load terminal L of the down counter 83, so that the on-duty ratio value $d_{on}$ of the latch circuit 81 is loaded in the down counter 83. Then, the clock terminal C of the down counter 83 receives a clock signal CLK2 supplied from the light distribution control unit 8, so that the content of the down counter 83 is decremented by 1 in response to each pulse of the clock signal CLK2. In this case, the frequency of the clock signal CLK2 is preferably larger than that of the clock signal CLK1. When the down counter 83 underflows to generate an underflow signal from its underflow terminal U, the RS-type flip-flop 85 is reset, so that the voltage at the drive voltage line falls. Simultaneously, the off-duty ratio value $d_{off}$ of the latch circuit 82 is loaded by the underflow signal of the down counter 83 in the down counter 84. Then, the clock terminal C of the down counter 84 receives the clock signal CLK2 supplied from the light distribution control unit 8, so that the content of the down counter 84 is decremented by 1 in response to each pulse of the clock signal CLK2. When the down counter 84 underflows to generate an underflow signal from its underflow terminal U, the RS-type flip-flop 85 is set, so that the voltage at the drive voltage line rises. Simultaneously, the duty ratio value $d_{on}$ of the latch circuit 81 is again loaded by the underflow signal of the down counter 84 in the down counter 83. Thus, the above-described operations are repeated, so that a pulse-shaped drive voltage having the on-duty ratio value $d_{on}$ and the off-duty ratio value $d_{off}$ can be generated.

In FIG. 6, after the down counters 83 and 84 generate underflow signals, the contents thereof are retained at 0.

Figures 7A, 7B:
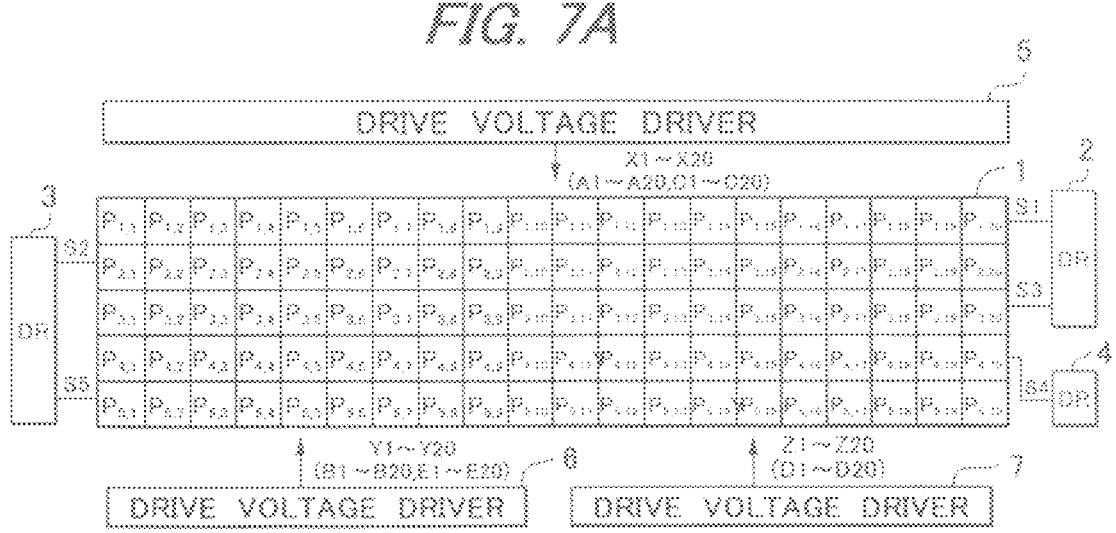
FIG. 7A is a simplified block circuit diagram of the lightening apparatus of FIG. 1.
FIG. 7B is a diagram showing the maximum luminous intensities of the LED elements of FIG. 7A when the on-duty ratios of the luminous drive voltages are 100%.

FIG. 7A is a simplified block circuit diagram of the lightening apparatus of FIG. 1, and FIG. 7B is a diagram for explaining the maximum luminous intensities of the LED elements $P_{1,1}, P_{1,2}, \ldots, P_{1,20}; P_{2,1}, P_{2,2}, \ldots, P_{2,20}; P_{3,1}, P_{3,2}, \ldots, P_{3,20}; P_{4,1}, P_{4,2}, \ldots P_{4,20};$ and $P_{5,1}, P_{5,2}, \ldots, P_{5,20}$ of the LED panel 1 of FIG. 7A. In FIG. 7B, the voltages at the luminous drive voltage lines X1, X2, ..., X20; Y1, Y2, ..., Y20; and Z1, Z2, ..., Z20 have a high level such as the power supply voltage $V_{CC}$ with a 100% on-duty ratio. Also, assume that, when an LED element is driven over the entire period T0, the luminous intensity is 100.

The LED elements $P_{1,1}, P_{1,2}, \ldots, P_{1,20}$ for the first row are driven for the period T1 ($=0.2 \cdot T0$), so that the maximum luminous intensity of each of the LED elements $P_{1,1}, P_{1,2}, \ldots, P_{1,20}$ is 20 ($=100 \times 0.2$). Therefore, the luminous intensities of the LED elements $P_{1,1}, P_{1,2}, \ldots, P_{1,20}$ are ranged from 0 (dark) to 20 in accordance with the on-duty ratios of the luminous drive voltages A1, A2, ..., A20.

The LED elements $P_{2,1}, P_{2,2}, \ldots, P_{2,20}$ for the second row are driven for the period T2 ($=0.5 \cdot T0$), so that the maximum luminous intensity of each of the LED elements $P_{2,1}, P_{2,2}, \ldots, P_{2,20}$ is 50 ($=100 \times 0.5$). Therefore, the luminous intensities of the LED elements $P_{2,1}, P_{2,2}, \ldots, P_{2,20}$ are ranged from 0 (dark) to 50 in accordance with the on-duty ratios of the luminous drive voltages B1, B2, ..., B20.

The LED elements $P_{3,1}, P_{3,2}, \ldots, P_{3,20}$ for the third row are driven for the period T3 ($=0.8 \cdot T0$), so that the maximum luminous intensity of each of the LED elements $P_{3,1}, P_{3,2}, \ldots, P_{3,20}$ is 80 ($=100 \times 0.8$). Therefore, the luminous intensities of the LED elements $P_{3,1}, P_{3,2}, \ldots, P_{3,20}$ are ranged from 0 (dark) to 80 in accordance with the on-duty ratios of the luminous drive voltages C1, C2, ..., C20.

The LED elements $P_{4,1}, P_{4,2}, \ldots, P_{4,20}$ for the fourth row are driven for the period T0, so that the maximum luminous intensity of each of the LED elements $P_{4,1}, P_{4,2}, \ldots P_{4,20}$ is 100. Therefore, the luminous intensities of the LED elements $P_{4,1}, P_{4,2}, \ldots, P_{4,20}$ are ranged from 0 (dark) to 100 in accordance with the on-duty ratios of the luminous drive voltages D1, D2, ..., D20.

The LED elements $P_{5,1}, P_{5,2}, \ldots, P_{5,20}$ for the fifth row are driven for the period T5 ($=0.5 \cdot T0$), so that the maximum luminous intensity of each of the LED elements $P_{5,1}, P_{5,2}, \ldots, P_{5,20}$ is 50 ($=100 \times 0.5$). Therefore, the luminous intensities of the LED elements $P_{5,1}, P_{5,2}, \ldots, P_{5,20}$ are ranged from 0 (dark) to 50 in accordance with the on-duty ratios of the luminous drive voltages E1, E2, ..., E20.

Figure 8:
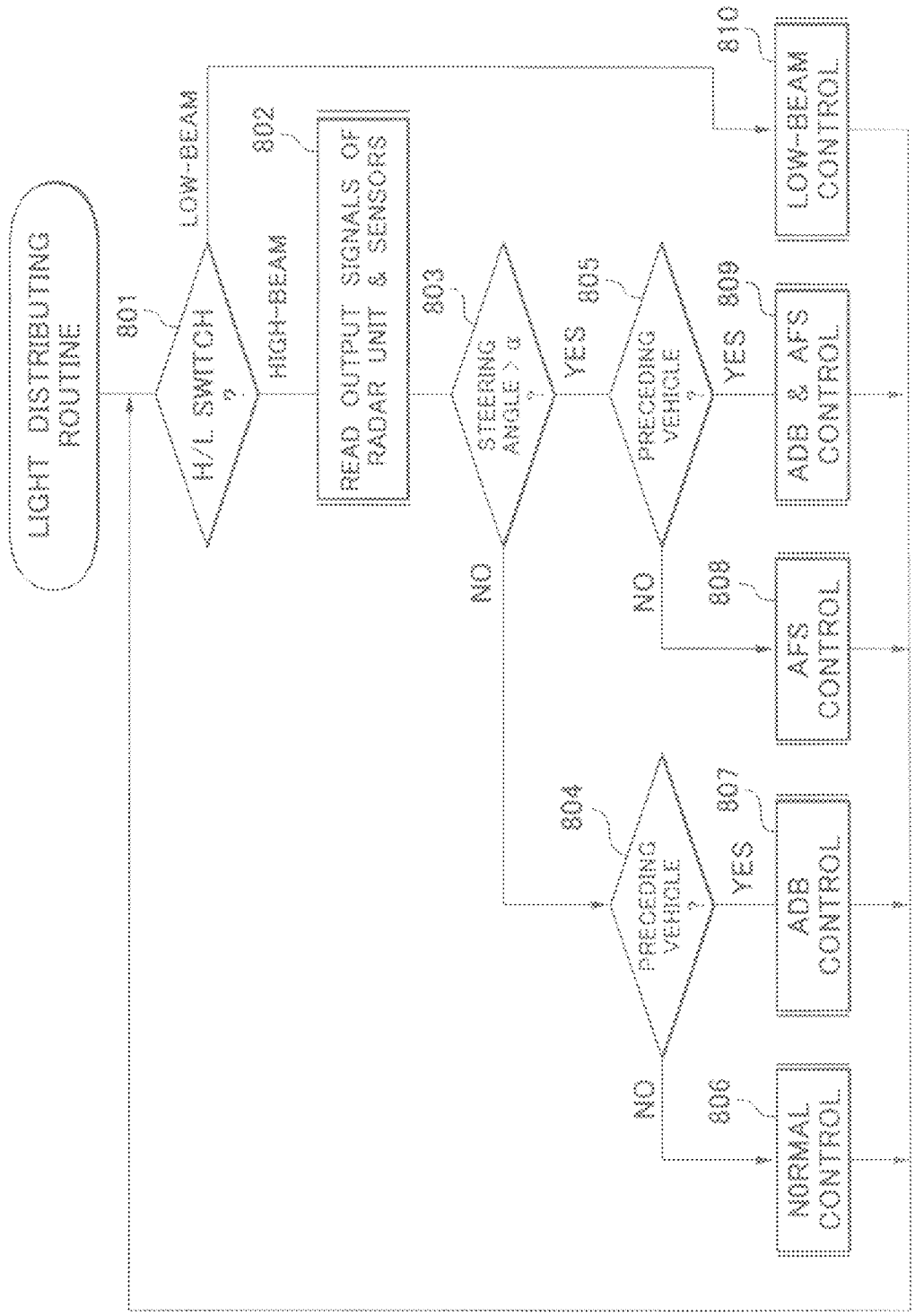
FIG. 8 is a flowchart for explaining the operation of the light distribution control unit of FIG. 1.

An operation of the light distribution control unit 8 is explained next with reference to a flowchart as illustrated in FIG. 8. This flowchart is carried out only when the headlamp switch 91 is turned on.

First, at step 801, it is determined whether or not the high/low (HL) beam switch 92 is on the high-beam side or on the low-beam side. When the high/low beam switch 91 is on the high-beam side, the flow proceeds to steps 802 to 809. Otherwise, the flow proceeds to step 810, which carries out a low-beam control.

At step 802, the light distribution control unit 8 reads the output signals of the radar unit 10, the steering angle sensor 11 and the other sensors.

Next, at step 803, it is determined whether or not the steering angle read from the steering angle sensor 11 is larger than a predetermined value a. Also, at steps 804 and 805, it is determined whether or not a preceding vehicle including an oncoming vehicle is detected by the radar unit 10.

When the steering angle is not larger than a and no preceding vehicle is detected, the flow proceeds from step 803 through step 804 to step 806 which carries out a normal high-beam control. That is, on-duty ratios $d_{on}(d_{on}+d_{off})$ of the luminous drive voltages A1, A2, ..., A20; B1, B2, ..., B20; C1, C2, ..., C20; D1, D2, ..., D20; and E1, E2, ..., E20 are calculated as illustrated in FIG. 9A in accordance with the output signals of the various sensors. In FIG. 9A, the on-duty ratios $d_{on}(d_{on}+d_{off})$ of the luminous drive voltages are made 1 (=100%) in a central area of the LED panel 1, while are made smaller than 1 (=100%) in right and left peripheral areas of the LED panel 1. Then, the luminous drive voltages A1, A2, ..., A20 and the luminous drive voltages C1, C2, ..., C20 are time-divisionally supplied to the luminous drive lines X1, X2, ..., X20, the luminous drive voltages B1, B2, ..., B20 and the luminous drive voltages E1, E2, ..., E20 are time-divisionally supplied to the luminous drive lines Y1, Y2, ..., Y20, and the luminous drive voltages D1, D2, ..., D20 are always supplied to the luminous drive lines Z1, Z2, ..., Z20. As a result, luminous intensities of the LED elements $P_{1,1}, P_{1,2}, \ldots, P_{1,20}; P_{2,1}, P_{2,2}, \ldots, P_{2,20}; P_{3,1}, P_{3,2}, \ldots, P_{3,20}; P_{4,1}, P_{4,2}, \ldots, P_{4,20};$ and $P_{5,1}, P_{5,2}, \ldots, P_{5,20}$ are realized as illustrated in FIG. 9B. In FIG. 9B, in a central area of the LED panel 1, the luminous intensities of the LED elements $P_{4,8}$ to $P_{4,13}$ for the fourth row are 100, and the luminous intensities of the LED elements $P_{3,8}$ to $P_{3,13}$ for the third row are 80. On the other hand, in a peripheral area of the LED panel 1, the luminous intensity is gradually decreased from 50 through 20 to 0.

When the steering angle is not larger than a and a preceding vehicle is detected, the flow proceeds from step 803 through step 804 to step 807 which carries out an adaptive drive beam (ADB) control. That is, on-duty ratios $d_{on}/(d_{on}+d_{off})$ of the luminous drive voltages A1, A2, ..., A20; B1, B2, ..., B20; C1, C2, ..., C20; D1, D2, ..., D20; and E1, E2, ..., E20 are calculated as illustrated in FIG. 10A in accordance with the output signals of the various sensors. In FIG. 10A, the on-duty ratios $d_{on}(d_{on}+d_{off})$ of the luminous drive voltages A9, A10, A11, A12; B9, B10, B11, B12; and C9, C10, C11, C12 for the first, second, third rows corresponding to the preceding vehicle are made 0 (=0%) in the central area of the LED panel 1 of FIG. 10A. Then, the luminous drive voltages A1, A2, ..., A20 and the luminous drive voltages C1, C2, ..., C20 are time-divisionally supplied to the luminous drive lines X1, X2, ..., X20, the luminous drive voltages B1, B2, ..., B20 and the luminous drive voltages E1, E2, ..., E20 are time-divisionally supplied to the luminous drive lines Y1, Y2, ..., Y20, and the luminous drive voltages D1, D2, ..., D20 are always supplied to the luminous drive lines Z1, Z2, ..., Z20. As a result, luminous intensity of the LED elements $P_{1,1}, P_{1,2}, \ldots, P_{1,20}; P_{2,1}, P_{2,2}, \ldots, P_{2,20}; P_{3,1}, P_{3,2}, \ldots, P_{3,20}; P_{4,1}, P_{4,2}, \ldots, P_{4,20},$ and $P_{5,1}, P_{5,2}, \ldots, P_{5,20}$ are realized as illustrated in FIG. 10B. In FIG. 10B, in a central area of the LED panel 1, the luminous intensities of the LED elements $P_{4,8}$ to $P_{4,13}$ for the fourth row are 100, and the luminous intensities of the LED elements $P_{3,8}$ and $P_{3,13}$ for the third row are 80. Also, in the central area of the LED panel 1, the luminous intensities of the LED elements $P_{1,9}$ to $P_{1,12}, P_{2,9}$ to $P_{2,12},$ and $P_{3,9}$ to $P_{3,12}$ for the first, second and third rows are 0 to decrease the illuminance against the preceding vehicle. On the other hand, in a peripheral area of the LED panel 1, the luminous intensity is gradually decreased from 50 through 20 to 0.

When the steering angle is larger than a and no preceding vehicle is detected, the flow proceeds from step 803 through step 805 to step 808 which carries out an adaptive front-lighting system (AFS) control. That is, on-duty ratios $d_{on}(d_{on}+d_{off})$ of the luminous drive voltages A1, A2, ..., A20; B1, B2, ..., B20; C1, C2, ..., C20; D1, D2, ..., D20; and E1, E2, ..., E20 are calculated as illustrated in FIG. 11A in accordance with the output signals of the various sensors. In FIG. 11A, when the steering direction is on the right side, the on-duty ratios $d_{on}/(d_{on}+d_{off})$ of the luminous drive voltages of FIG. 9A are shifted on the right side, to substantially change the optical direction of the LED panel 1 toward the right side. Then, the luminous drive voltages A1, A2, ..., A20 and the luminous drive voltages C1, C2, ..., C20 are time-divisionally supplied to the luminous drive lines X1, X2, ..., X20, the luminous drive voltages B1, B2, ..., B20 and the luminous drive voltages E1, E2, ..., E20 are time-divisionally supplied to the luminous drive lines Y1, Y2, ..., Y20, and the luminous drive voltages D1, D2, ..., D20 are always supplied to the luminous drive lines Z1, Z2, ..., Z20. As a result, luminous intensities of the LED elements $P_{1,1}, P_{1,2}, \ldots P_{1,20}; P_{2,1}, P_{2,2}, \ldots, P_{2,20}; P_{3,1}, P_{3,2}, \ldots P_{3,20}; P_{4,1}, P_{4,2}, \ldots, P_{4,20},$ and $P_{5,1}, P_{5,2}, \ldots, P_{5,20}$ are realized as illustrated in FIG. 11B. In FIG. 11B, in a right-side central area of the LED panel 1, the luminous intensities of the LED elements $P_{4,10}$ to $P_{4,15}$ for the fourth row are 100, and the luminous intensities of the LED elements $P_{3,10}$ to $P_{3,15}$ for the third row is 80. On the other hand, in a left-side peripheral area of the LED panel 1, the luminous intensity is gradually decreased from 50 through 20 to 0, while in a right-side peripheral area of the LED panel 1, the luminous intensity is gradually decreased from 50 to 20.

When the steering angle is larger than a and a preceding vehicle is detected, the flow proceeds from step 803 through step 805 to step 809 which carries out both of an adaptive drive beam (ADB) and an adaptive front-lighting system (AFS) control. That is, on-duty ratios $d_{on}/(d_{on}+d_{off})$ of the luminous drive voltages A1, A2, ..., A20; B1, B2, ..., B20; C1, C2, ..., C20; D1, D2, ..., D20; and E1, E2, ..., E20 are calculated as illustrated in FIG. 12A in accordance with the output signals of the various sensors. In FIG. 12A, when the steering direction is on the right side, the on-duty ratios $d_{on}(d_{on}+d_{off})$ of the luminous drive voltages of FIG. 10A are shifted on the right side, to substantially change the optical direction of the LED panel 1 toward the right side. In addition, the on-duty ratios $d_{on}(d_{on}+d_{off})$ of the luminous drive voltages A11, A12, A13, A14; B11, B12, B13, B14; and C11, C12, C13, C14 for the first, second and third rows corresponding to the preceding vehicle are made 0 (=0%). Then, the luminous drive voltages A1, A2, ..., A20 and the luminous drive voltages C1, C2, ..., C20 are time-divisionally supplied to the luminous drive lines X1, X2, ..., X20, the luminous drive voltages B1, B2, ..., B20 and the luminous drive voltages E1, E2, ..., E20 are time-divisionally supplied to the luminous drive lines Y1, Y2, ..., Y20, and the luminous drive voltages D1, D2, ..., D20 are always supplied to the luminous drive lines Z1, Z2, ..., Z20. As a result, luminous intensities of the LED elements $P_{1,1}, P_{1,2}, \ldots, P_{1,20}; P_{2,1}, P_{2,2}, \ldots, P_{2,20}; P_{3,1}, P_{3,2}, \ldots, P_{3,20}; P_{4,1}, P_{4,2}, \ldots, P_{4,20};$ and $P_{5,1}, P_{5,2}, \ldots, P_{5,20}$ are realized as illustrated in FIG. 12B. In FIG. 12B, in a right-side central area of the LED panel 1, the luminous intensities of the LED elements $P_{4,10}$ to $P_{4,15}$ for the fourth row are 100, and the luminous intensities of the LED elements $P_{3,10}$ to $P_{3,15}$ for the third row are 80. Also, the luminous intensities of the LED elements $P_{1,11}$ to $P_{1,14}, P_{2,11}$ to $P_{2,14}$ and $P_{3,11}$ to $P_{3,14}$ are 0 to decrease the illumination against the preceding vehicle. On the other hand, in a left-side peripheral area of the LED panel 1, the luminous intensity is gradually decreased from 50 through 20 to 0, while in a right-side peripheral area of the LED panel 1, the luminous intensity is gradually decreased from 50 to 20.

At step 810, a low-beam control similar to the normal high-beam control is carried out. Particularly, on-duty ratios of the luminous drive voltages A1, A2, . . . , A20 for the first row are made 0 (0%) to decline the optical direction of the LED panel 1, so that a cutoff line is made clear.

Since the lightening apparatus of FIG. 1 is driven by a dynamic driving method and a static driving method, the number of voltage lines including reference voltage lines and luminous voltage lines is 65 (=5+20×3). Note that if the lightening apparatus of FIG. 1 is driven by only a static driving method, the number of voltage lines is 100 (=20×5) plus the ground line. Therefore, the number of voltage lines can be decreased. Also, since one output amplifier is required for each of the voltage lines, the number of output amplifiers can be decreased to reduce the lightening apparatus in size and the power consumption thereof.

On the other hand, in the lightening apparatus of FIG. 1, since every two reference voltage lines are time-divisionally driven by a dynamic driving method, the luminous period for every row of the LED panel 1 can be increased as compared with those where five reference voltage lines time-divisionally driven by a dynamic driving method, thus increasing the brightness of the LED panel 1.

Still further, in the lightening apparatus of FIG. 1, the duty ratio T1(T1+T3) for one time-divisional driving is different from the duty ratio T3(T3+T5) for another time-divisional driving, areas having different luminous intensities are created in the LED panel 1. In more detail, since the maximum luminous intensities of the first row, the second row, the third row, the fourth row and the fifth row are 20, 50, 80, 100 and 50, respectively, optimum light distribution patterns for vehicle headlamps whose luminous intensities are gradually changed as illustrated in FIGS. 9B, 10B, 11B and 12B can be realized.

Figures 13A, 13B:
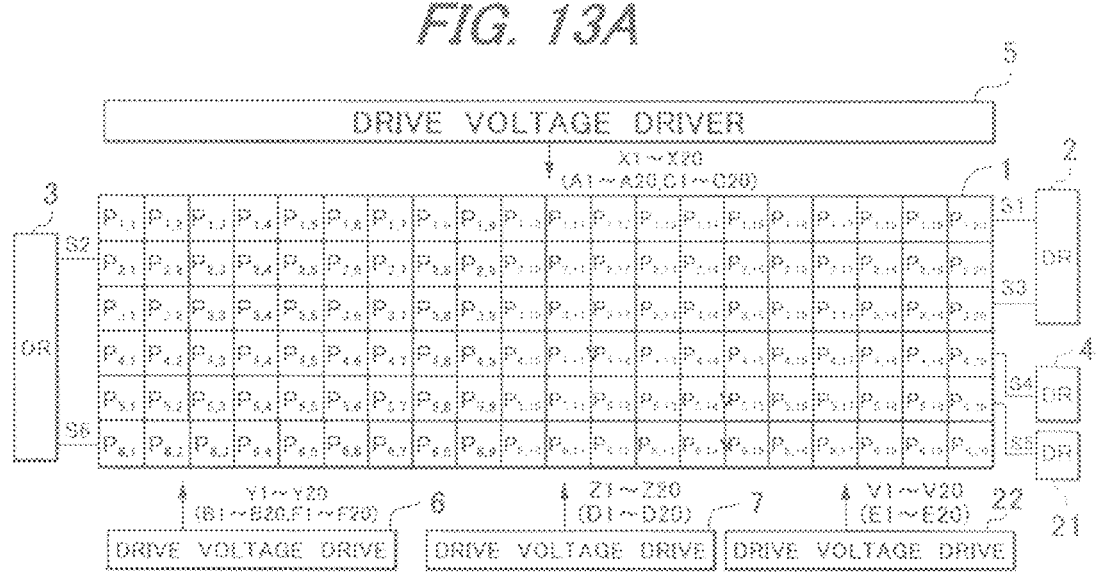
FIG. 13A is a block circuit diagram illustrating a second embodiment of the lightening apparatus according to the presently disclosed subject matter.
FIG. 13B is a diagram for explaining the maximum luminous intensities of the LED elements of FIG. 13A.

FIG. 13A is a block circuit diagram illustrating a second embodiment of the lightening apparatus according to the presently disclosed subject matter, and FIG. 13B is a diagram for explaining the maximum luminous intensities of the LED elements of FIG. 13A.

In FIG. 13A, LED elements $P_{6,1}, P_{6,2}, \ldots, P_{6,20}$ connected to a reference voltage line S6 and drive voltage lines V1, V2, . . . , V20 are added to the LED panel 1 of FIG. 7A. Also, a reference voltage driver 21 and a drive voltage driver 22 are added to the lightening apparatus of FIG. 7A.

The reference voltage driver 3 is a multiplexing switching circuit which time-divisionally activates or switches the reference voltage lines S2 and S6 with a luminous period ratio of T2:T6=50:50 where T0=T2+T6. Simultaneously, the drive voltage driver 6 is operated in synchronization with the time-divisional switching of the reference voltage lines S2 and S6. That is, the drive voltage driver 6 is driven by the voltage at the reference voltage line S2, so that the drive voltage driver 6 generates pulse-shaped luminous drive voltages B1, B2, . . . , B20 defined by their on-duty ratios for the second row during the luminous period T2, i.e., voltage at Y1=B1
voltage at Y2=B2
. . .
voltage at Y20=B20.

Also, the drive voltage driver 6 is driven by the voltage at the reference voltage line S6, so that the drive voltage driver 6 generates pulse-shaped luminous drive voltages F1, F2, . . . , F20 defined by their on-duty ratios for the sixth row during the luminous period T6, i.e., voltage at Y1=F1
voltage at Y2=F2
. . .
voltage at Y20=F20.

Thus, the LED elements $P_{2,1}, P_{2,2}, \ldots, P_{2,20}$ for the second row and the LED elements $P_{6,1}, P_{6,2}, \ldots, P_{6,20}$ for the sixth row are time-divisionally driven by a dynamic driving method.

The reference voltage driver 21 is a simple switching circuit, similar to the reference voltage driver 4 of FIG. 4C, which activates or switches the reference voltage line S5 over the entire luminous period T0. In this case, the drive voltage driver 22 generates pulse-shaped luminous drive voltages E1, E2, . . . , E20 defined by their on-duty ratios for the fifth row during the entire luminous period T0, i.e., voltage at V1=E1
voltage at V2=E2
. . .
voltage at V20=E20.

Thus, the LED elements $P_{5,1}, P_{5,2}, \ldots, P_{5,20}$ for the fifth row are driven by a static driving method.

In FIG. 13B, the maximum luminous intensity of each of the LED elements $P_{1,1}, P_{1,2}, \ldots, P_{1,20}$ for the first row is 20 (=100×0.2). Therefore, the luminous intensities of the LED elements $P_{1,1}, P_{1,2}, \ldots, P_{1,20}$ are ranged from 0 (dark) to 20 in accordance with the on-duty ratios of the luminous drive voltages A1, A2, . . . , A20. The maximum luminous intensity of each of the LED elements $P_{2,1}, P_{2,2}, \ldots, P_{2,20}$ for the second row is 50 (=100×0.5). Therefore, the luminous intensities of the LED elements $P_{2,1}, P_{2,2}, \ldots, P_{2,20}$ are ranged from 0 (dark) to 50 in accordance with the on-duty ratios of the luminous drive voltages B1, B2, . . . , B20. The maximum luminous intensity of each of the LED elements $P_{3,1}, P_{3,2}, \ldots, P_{3,20}$ for the third row is 80 (=100×0.8). Therefore, the luminous intensities of the LED elements $P_{3,1}, P_{3,2}, \ldots, P_{3,20}$ are ranged from 0 (dark) to 80 in accordance with the on-duty ratios of the luminous drive voltages C1, C2, . . . , C20. The maximum luminous intensity of each of the LED elements $P_{4,1}, P_{4,2}, \ldots, P_{4,20}$ for the fourth row is 100. Therefore, the luminous intensities of the LED elements $P_{4,1}, P_{4,2}, \ldots, P_{4,20}$ are ranged from 0 (dark) to 100 in accordance with the on-duty ratios of the luminous drive voltages D1, D2, . . . , D20. The maximum luminous intensity of each of the LED elements $P_{5,1}, P_{5,2}, \ldots, P_{5,20}$ for the fifth row is 100. Therefore, the luminous intensities of the LED in accordance with the on-duty ratios of the luminous drive voltages E1, E2, . . . , E20. The maximum luminous intensity of each of the LED elements $P_{6,1}, P_{6,2}, \ldots, P_{6,20}$ for the sixth row is 50 (=100×0.5). Therefore, the luminous intensities of the LED elements $P_{6,1}, P_{6,2}, \ldots, P_{6,20}$ are ranged from 0 (dark) to 50 in accordance with the on-duty ratios of the luminous drive voltages F1, F2, . . . , F20.

Thus, according to the lightening apparatus of FIGS. 13A and 13B, the number of rows in the LED panel 1 can easily be increased.

FIG. 14A is a block circuit diagram illustrating a third embodiment of the lightening apparatus according to the presently disclosed subject matter, and FIG. 14B is a diagram for explaining the maximum luminous intensities of the LED elements of FIG. 14A.

In FIG. 14A, the reference voltage driver 21 and the drive voltage driver 22 of FIG. 13A are removed, and the reference voltage driver 2 and the drive voltage driver 5 of FIG.

13A are replaced by a reference voltage driver 2' and a drive voltage driver 5', respectively.

The reference voltage driver 2' is a multiplexing switching circuit which time-divisionally activates the reference voltage lines S1, S2 and S5 with an luminous period ratio of T1:T2:T5=10:20:70 where T0=T1+T2+T5. Simultaneously, the drive voltage driver 5' is operated in synchronization with the time-divisional switching of the reference voltage lines S1, S2 and S5. That is, the drive voltage driver 5' is driven by the voltage at the reference voltage line S1, so that the drive voltage driver 5' generates pulse-shaped luminous drive voltages A1, A2, . . . , A20 defined by their on-duty ratios for the first row during the luminous period T1, i.e., voltage at X1=A1
voltage at X2=A2
. . .
voltage at X20=A20.

Also, the drive voltage driver 5' is driven by the voltage at the reference voltage line S2, so that the drive voltage driver 5' generates pulse-shaped luminous drive voltages B1, B2, . . . , B20 defined by their on-duty ratios for the second row during the luminous period T2, i.e., voltage at X1=B1
voltage at X2=B2
. . .
voltage at X20=B20.

Further, the drive voltage driver 5' is driven by the voltage at the reference voltage line S5, so that the drive voltage driver 5' generates pulse-shaped luminous drive voltages E1, E2, . . . , E20 defined by their on-duty ratios for the fifth row during the luminous period T5, i.e., voltage at X1=E1
voltage at X2=E2
. . .
voltage at X20=E20.

Thus, the LED elements $P_{1,1}, P_{1,2}, \ldots, P_{1,20}$ for the first row, the LED elements $P_{2,1}, P_{2,2}, \ldots, P_{2,20}$ for the second row and the LED elements $P_{5,1}, P_{5,2}, \ldots, P_{5,20}$ for the fifth row are time-divisionally driven by a dynamic driving method.

The reference voltage driver 3 is a multiplexing switching circuit which time-divisionally activates the reference voltage lines S3 and S6 with a luminous period ratio of T3:T6=80:20 where T0=T3+T6. Simultaneously, the drive voltage driver 3 is operated in synchronization with the time-divisional switching of the reference voltage lines S3 and S6. That is, the drive voltage driver 6 is driven by the voltage at the reference voltage line S2, so that the drive voltage driver 6 generates pulse-shaped luminous drive voltages C1, C2, . . . , C20 defined by their on-duty ratios for the third row during the luminous period T3, i.e., voltage at Y1=C1
voltage at Y2=C2
. . .
voltage at Y20=C20.

Also, the drive voltage driver 6 is driven by the voltage at the reference voltage line S6, so that the drive voltage driver 6 generates pulse-shaped luminous drive voltages F1, F2, . . . , F20 defined by their on-duty ratios for the sixth row during the luminous period T6, i.e., voltage at Y1=F1
voltage at Y2=F2
. . .
voltage at Y20=F20.

Thus, the LED elements $P_{3,1}, P_{3,2}, \ldots, P_{3,20}$ for the third row and the LED elements $P_{6,1}, P_{6,2}, \ldots, P_{6,20}$ for the sixth row are time-divisionally driven by a dynamic driving method.

The reference voltage driver 4 is a simple switching circuit which activates or switches the reference voltage line S4 over the entire luminous period T0. In this case, the drive voltage driver 7 generates pulse-shaped luminous drive voltages D1, D2, . . . , D20 defined by their on-duty ratios for the fourth row during the entire luminous period T0, i.e., voltage at Z1=D1
voltage at Z2=D2
. . .
voltage at Z20=D20.

Thus, the LED elements $P_{4,1}, P_{4,2}, \ldots, P_{4,20}$ for the fourth row are driven by a static driving method.

In FIG. 14B, the maximum luminous intensity of each of the LED elements $P_{1,1}, P_{1,2}, \ldots, P_{1,20}$ for the first row is 10 (=100×0.1). Therefore, the luminous intensities of the LED elements $P_{1,1}, P_{1,2}, \ldots, P_{1,20}$ are ranged from 0 (dark) to 10 in accordance with the on-duty ratios of the luminous drive voltages A1, A2, . . . , A20. The maximum luminous intensity of each of the LED elements $P_{2,1}, P_{2,2}, \ldots, P_{2,20}$ for the second row is 20 (=100×0.2). Therefore, the luminous intensities of the LED elements $P_{2,1}, P_{2,2}, \ldots, P_{2,20}$ are ranged from 0 (dark) to 20 in accordance with the on-duty ratios of the luminous drive voltages B1, B2, . . . , B20. The maximum luminous intensity of each of the LED elements $P_{3,1}, P_{3,2}, \ldots, P_{3,20}$ for the third row is 80 (=100×0.8). Therefore, the luminous intensities of the LED elements $P_{3,1}, P_{3,2}, \ldots, P_{3,20}$ are ranged from 0 (dark) to 80 in accordance with the on-duty ratios of the luminous drive voltages C1, C2, . . . , C20. The maximum luminous intensity of each of the LED elements $P_{4,1}, P_{4,2}, \ldots, P_{4,20}$ for the fourth row is 100. Therefore, the luminous intensities of the LED elements $P_{4,1}, P_{4,2}, \ldots, P_{4,20}$ are ranged from 0 (dark) to 100 in accordance with the on-duty ratios of the luminous drive voltages D1, D2, . . . , D20. The maximum luminous intensity of each of the LED elements $P_{5,1}, P_{5,2}, \ldots, P_{5,20}$ for the fifth row is 70 (=100×0.7). Therefore, the luminous intensities of the LED elements $P_{5,1}, P_{5,2}, \ldots, P_{5,20}$ are ranged from 0 (dark) to 70 in accordance with the on-duty ratios of the luminous drive voltages E1, E2, . . . , E20. The maximum luminous intensity of each of the LED elements $P_{0,1}, P_{6,2}, \ldots, P_{6,20}$ for the sixth row is 20 (=100×0.2). Therefore, the luminous intensities of the LED elements $P_{0,1}, P_{6,2}, \ldots, P_{6,20}$ are ranged from 0 (dark) to 20 in accordance with the on-duty ratios of the luminous drive voltages F1, F2, . . . , F20.

Figure 15:
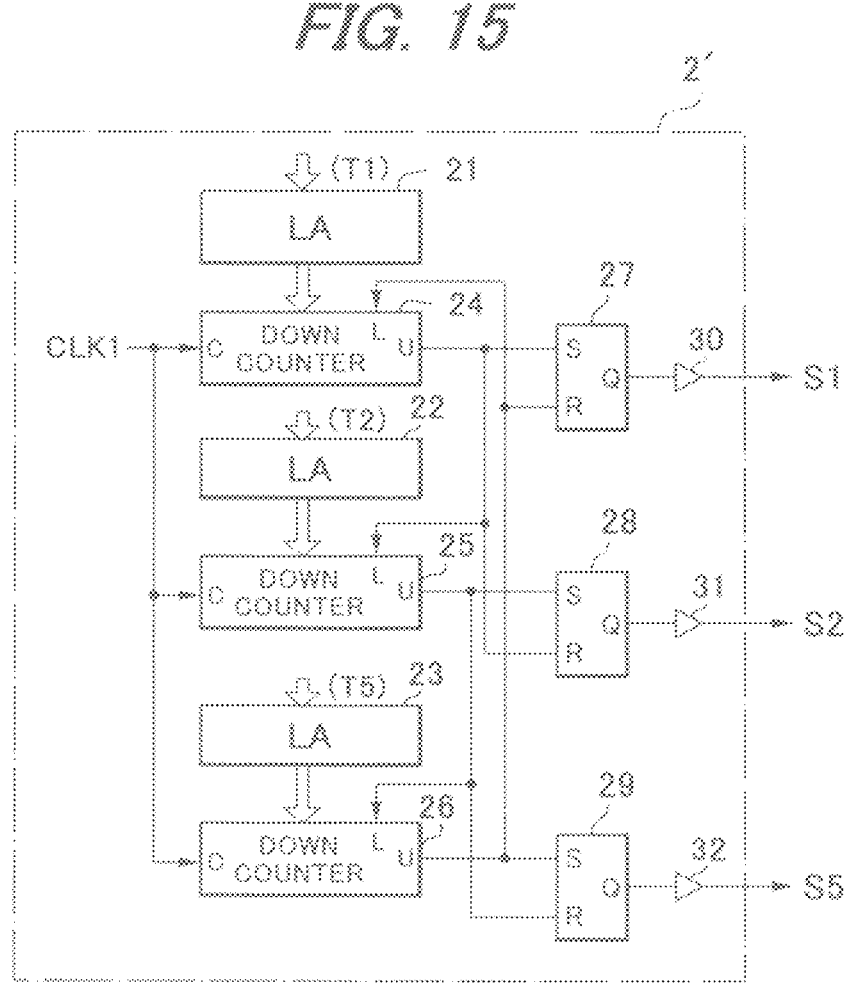
FIG. 15 is a block circuit diagram of the reference voltage driver of FIG. 14A.

In FIG. 15, which is a block circuit diagram of the reference voltage driver 2' of FIG. 14A, the reference voltage driver 2' is constructed by a PWM circuit which includes latch circuits 21', 22' and 23', down counters 24', 25' and 26', RS-type flip-flops 27', 28' and 29', and output amplifiers 30', 31' and 32' for generating voltages at the reference voltage lines S1, S2 and S5.

When the PWM circuit of FIG. 15 is activated by the light distribution control unit 8, first, duty ratio values corresponding to the luminous periods T1, T2 and T5 are preset in the latch circuits 21', 22' and 23', respectively. Then, a load signal (not shown) may initially be supplied to the load terminal L of the down counter 24', so that the duty ratio value of the latch circuit 21' is loaded in the down counter 24'. Then, the clock terminal C of the down counter 24' receives a clock signal CLK1 supplied from the light distribution control unit 8, so that the content of the down counter 24' is decremented by 1 in response to each pulse of the clock signal CLK1. When the down counter 24' underflows to generate an underflow signal from its underflow terminal U, the RS-type flip-flop 27' is set, so that the voltage at the reference voltage line S1 rises. Simultaneously, the duty ratio value of the latch circuit 22' is loaded by the underflow signal of the down counter 24' in the down counter 25'. Then, the clock terminal C of the down counter 25' receives the clock signal CLK1 supplied from the light distribution control unit 8, so that the content of the down counter 25' is decremented by 1 in response to each pulse of the clock signal CLK1. When the down counter 26' underflows to generate an underflow signal from its underflow terminal U, the RS-type flip-flop 28' is set, so that the voltage at the reference voltage line S2 rises. Simultaneously, the duty ratio value of the latch circuit 23' is loaded by the underflow signal of the down counter 25' in the down counter 26'. Then, the clock terminal C of the down counter 26' receives the clock signal CLK1 supplied from the light distribution control unit 8, so that the content of the down counter 26' is decremented by 1 in response to each pulse of the clock signal CLK1. When the down counter 26' underflows to generate an underflow signal from its underflow terminal U, the RS-type flip-flop 29' is set, so that the voltage at the reference voltage line S5 rises. Simultaneously, the duty ratio value of the latch circuit 21' is again loaded by the underflow signal of the down counter 26' in the down counter 24'. Thus, the above-described operations are repeated, so that the voltages at the reference voltage lines S1, S2 and S5 whose luminous period ratio of T1:T2:T5=10:20:70 can be generated.

Thus, in the lightening apparatus of FIGS. 14A and 14B, the multiplexity of one reference voltage driver is 3. However, the multiplexity per one reference voltage driver can easily be increased to the number of rows of LED elements in the LED panel 1.

FIG. 16A is a block circuit diagram illustrating a fourth embodiment of the lightening apparatus according to the presently disclosed subject matter, and FIG. 16B is a diagram for explaining the maximum luminous intensities of the LED elements of FIG. 16A.

In FIG. 16A, the reference voltage drivers 4 and 21 of FIG. 13A are combined into one reference voltage drivers 4', and the drive voltage drivers 7 and 22 of FIG. 13A are combined into one drive voltage driver 7'.

The reference voltage driver 2 is a multiplexing switching circuit which time-divisionally activates or switches the reference voltage lines S1 and S4 with luminous period ratio of T1:T4=10:90 where T0=T1+T4. Simultaneously, the drive voltage driver 5 is operated in synchronization with the time-divisional switching of the reference voltage lines S1 and S4. That is, the drive voltage driver 5 is driven by the voltage at the reference voltage line S1, so that the drive voltage driver 5 generates pulse-shaped luminous drive voltages A1, A2, . . . , A20 defined by their on-duty ratios for the first row during the luminous period T1, i.e., voltage at X1=A1
voltage at X2=A2
. . .
voltage at X20=A20.

Also, the drive voltage driver 5 is driven by the voltage at the reference voltage line S4, so that the drive voltage driver 5 generates pulse-shaped luminous drive voltages D1, D2, . . . , D20 defined by their on-duty ratios for the third row during the luminous period T4, i.e., voltage at X1=D1
voltage at X2=D2
. . .
voltage at X20=D20.

Thus, the LED elements $P_{1,1}, P_{1,2}, \ldots, P_{1,20}$ for the first row and the LED elements $P_{4,1}, P_{4,2}, \ldots, P_{4,20}$ for the fourth row are time-divisionally driven by a dynamic driving method.

The reference voltage driver 3 is a multiplexing switching circuit which time-divisionally activates or switches the reference voltage lines S2 and S5 with a luminous period ratio of T2:T5=40:60 where T0=T2+T5. Simultaneously, the drive voltage driver 6 is operated in synchronization with the time-divisional switching of the reference voltage lines S2 and S5. That is, the drive voltage driver 6 is driven by the voltage at the reference voltage line S2, so that the drive voltage driver 6 generates pulse-shaped luminous drive voltages B1, B2, . . . , B20 defined by their on-duty ratios for the second row during the luminous period T2, i.e., voltage at Y1=B1
voltage at Y2=B2
. . .
voltage at Y20=B20.

Also, the drive voltage driver 6 is driven by the voltage at the reference voltage line S5, so that the drive voltage driver 6 generates pulse-shaped luminous drive voltages E1, E2, . . . , E20 defined by their on-duty ratios for the fifth row during the luminous period T5, i.e., voltage at Y1=E1
voltage at Y2=E2
. . .
voltage at Y20=E20.

Thus, the LED elements $P_{2,1}, P_{2,2}, \ldots, P_{2,20}$ for the second row and the LED elements $P_{5,1}, P_{5,2}, \ldots, P_{5,20}$ for the fifth row are time-divisionally driven by a dynamic driving method.

The reference voltage driver 4' is a multiplexing switching circuit which time-divisionally activates or switches the reference voltage lines S3 and S6 with a luminous period ratio of T3:T6=80:20 where T0=T3+T6. Simultaneously, the drive voltage driver 4' is operated in synchronization with the time-divisional switching of the reference voltage lines S2 and S5. That is, the drive voltage driver 6 is driven by the voltage at the reference voltage line S3, so that the drive voltage driver 4' generates pulse-shaped luminous drive voltages C1, C2, . . . , C20 defined by their on-duty ratios for the second row during the luminous period T2, i.e., voltage at Z1=C1
voltage at Z2=C2
. . .
voltage at Z20=C20.

Also, the drive voltage driver 4' is driven by the voltage at the reference voltage line S6, so that the drive voltage driver 6 generates pulse-shaped luminous drive voltages F1, F2, . . . , F20 defined by their on-duty ratios for the sixth row during the luminous period T6, i.e., voltage at Z1=F1
voltage at Z2=F2
. . .
voltage at Z20=F20.

Thus, the LED elements $P_{3,1}, P_{3,2}, \ldots, P_{3,20}$ for the third row and the LED elements $P_{6,1}, P_{6,2}, \ldots, P_{6,20}$ for the sixth row are time-divisionally driven by a dynamic driving method.

In FIG. 16B, the maximum luminous intensity of each of the LED elements $P_{1,1}, P_{1,2}, \ldots, P_{1,20}$ for the first row is 10 (=100×0.1). Therefore, the luminous intensities of the LED elements $P_{1,1}, P_{1,2}, \ldots, P_{1,20}$ are ranged from 0 (dark) to 10 in accordance with the on-duty ratios of the luminous drive voltages A1, A2, . . . , A20. The maximum luminous intensity of each of the LED elements $P_{2,1}, P_{2,2}, \ldots, P_{2,20}$ for the second row is 40 (=100×0.4). Therefore, the luminous intensities of the LED elements $P_{2,1}, P_{2,2}, \ldots, P_{2,20}$ are ranged from 0 (dark) to 40 in accordance with the on-duty ratios of the luminous drive voltages B1, B2, . . . , B20. The maximum luminous intensity of each of the LED elements $P_{3,1}, P_{3,2}, \ldots, P_{3,20}$ for the third row is 80 (=100×0.8). Therefore, the luminous intensities of the LED elements $P_{3,1}, P_{3,2}, \ldots, P_{3,20}$ are ranged from 0 (dark) to 80 in accordance with the on-duty ratios of the luminous drive voltages C1, C2, . . . , C20. The maximum luminous intensity of each of the LED elements $P_{4,1}, P_{4,2}, \ldots, P_{4,20}$ for the fourth row is 90 (=100×0.9). Therefore, the luminous intensities of the LED elements $P_{4,1}, P_{4,2}, \ldots, P_{4,20}$ are ranged from 0 (dark) to 90 in accordance with the on-duty ratios of the luminous drive voltages D1, D2, . . . , D20. The maximum luminous intensity of each of the LED elements $P_{5,1}, P_{5,2}, \ldots, P_{5,20}$ for the fifth row is 60 (=100×0.6). Therefore, the luminous intensities of the LED elements $P_{5,1}, P_{5,2}, \ldots, P_{5,20}$ are ranged from 0 (dark) to 60 in accordance with the on-duty ratios of the luminous drive voltages E1, E2, . . . , E20. The maximum luminous intensity of each of the LED elements $P_{6,1}, P_{6,2}, \ldots, P_{6,20}$ for the sixth row is 20 (=100×0.2). Therefore, the luminous intensities of the LED elements $P_{6,1}, P_{6,2}, \ldots, P_{6,20}$ are ranged from 0 (dark) to 20 in accordance with the on-duty ratios of the luminous drive voltages F1, F2, . . . , F20.

Thus, according to the lightening apparatus of FIGS. 16A and 16B, all the reference voltage drivers can be constructed by multiplexing switching circuits. As a result, the number of voltage lines can be decreased as compared with that of FIGS. 13A and 13B.

Figure 17A:
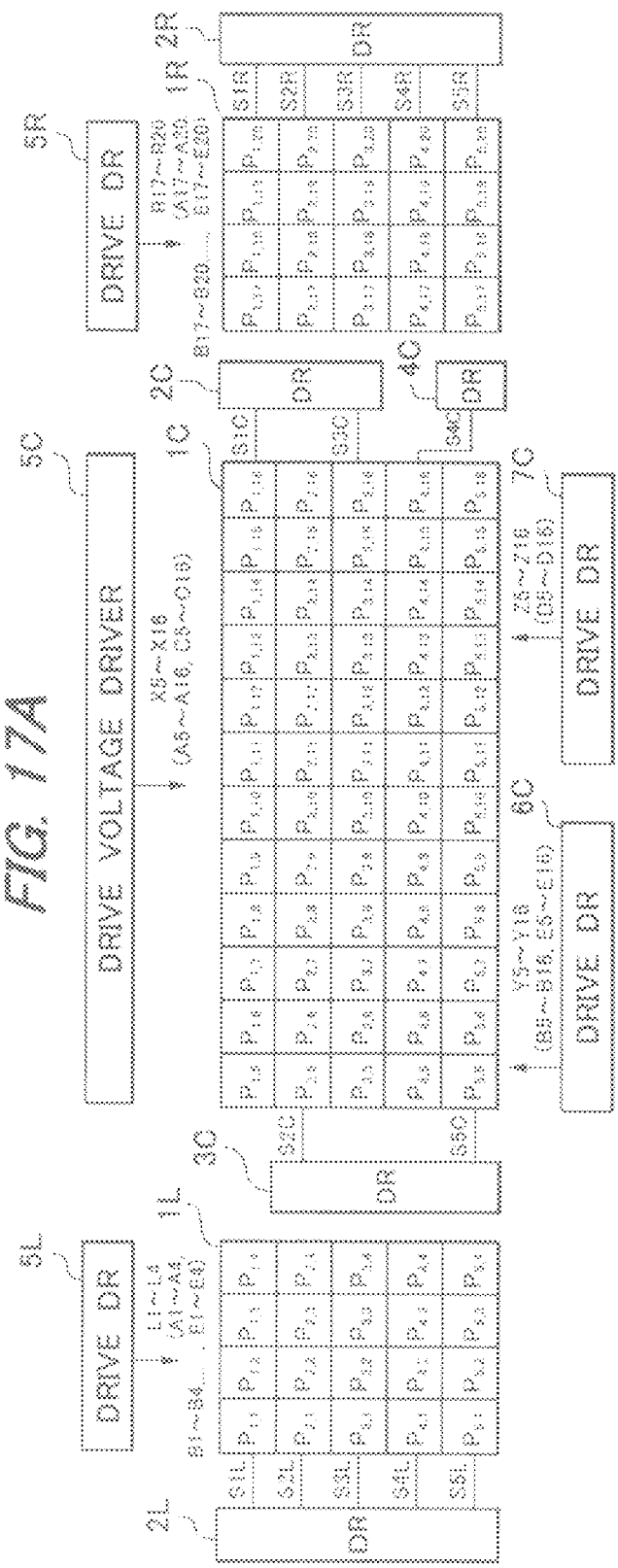
FIG. 17A is a block circuit diagram illustrating a fifth embodiment of the lightening apparatus according to the presently disclosed subject matter.
Figure 17B:
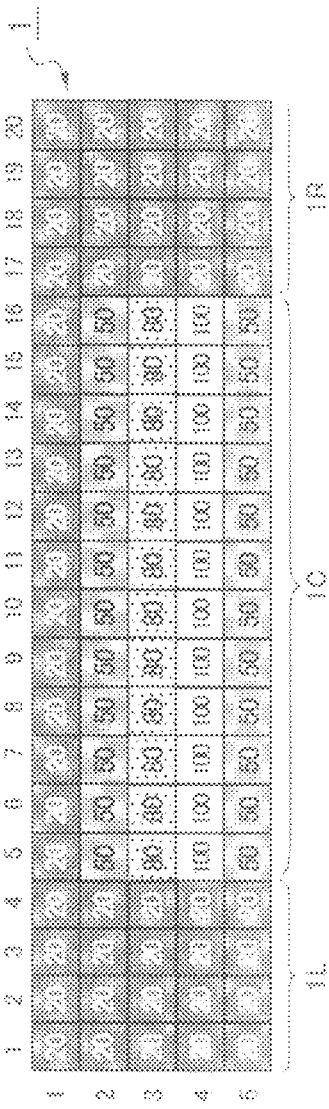
FIG. 17B is a diagram for explaining the maximum luminous intensities of the LED elements of FIG. 17A.

FIG. 17A is a block circuit diagram illustrating a fifth embodiment of the lightening apparatus according to the presently disclosed subject matter, and FIG. 17B is a diagram for explaining the maximum luminous intensities of the LED elements of FIG. 17A.

In FIG. 17A, the LED panel 1 of FIG. 7A is divided into a left-side LED portion 1L formed by the LED elements $P_{1,1}, P_{1,2}, P_{1,3}, P_{1,4}; P_{2,1}, P_{2,2}, P_{2,3}, P_{2,4}; \ldots$; and $P_{5,1}, P_{5,2}, P_{5,3}, P_{5,4}$, a center-side LED portion 1C formed by the LED elements $P_{1,5}, P_{1,6}, \ldots, P_{1,16}; P_{2,5}, P_{2,6}, \ldots, P_{2,16}; \ldots; P_{5,5}, P_{5,6}, \ldots, P_{5,16}$, a right-side LED portion 1R formed by the LED elements $P_{1,17}, P_{1,18}, P_{1,19}, P_{1,20}; P_{2,17}, P_{2,18}, P_{2,19}, P_{2,20}; \ldots$; and $P_{5,17}, P_{5,18}, P_{5,19}, P_{5,20}$.

The center-side LED portion 1C is obtained by reducing the LED panel 1 of FIG. 7A. That is, the center-side LED portion 1C can be operated by reference voltage drivers 2C, 3C and 4C similar to the reference voltage drivers 2, 3 and 4, respectively, of FIG. 7A, and drive voltage drivers 5C, 6C and 7C similar to the drive voltage drivers 5, 6 and 7, respectively, of FIG. 7A. Therefore, the description on the operation of the center-side LED portion 1C is omitted.

The left-side LED portion 1L is explained next in detail.

The cathode electrodes of the LED elements $P_{1,1}, P_{1,2}, P_{1,3}, P_{1,4}; P_{2,1}, P_{2,2}, P_{2,3}, P_{2,4}; \ldots$; and $P_{5,1}, P_{5,2}, P_{5,3}, P_{5,4}$ are connected to reference voltage lines S1L, S2L, S3L, S4L and S5L, respectively. On the other hand, the anode electrodes of the LED elements $P_{1,1}, P_{2,1}, P_{3,1}, P_{4,1}, P_{5,1}; P_{1,2}, P_{2,2}, P_{3,2}, P_{4,2}; P_{1,3}, P_{2,3}, P_{3,3}, P_{4,3}; P_{1,4}, P_{2,4}, P_{3,4}, P_{4,4}$ are connected to drive voltage lines L1, L2, L3, L4, respectively. A reference voltage driver 2L supplies reference voltages such as the ground voltage GND to the reference voltage lines S1L, S2L, S3L, S4L and S5L, while a drive voltage driver 5L supplies luminous drive voltages to the drive voltage lines L1, L2, L3 and L4.

The reference voltage driver 2L is a multiplexing switching circuit which time-divisionally activates or switches the reference voltage lines S1L, S2L, S3L, S4L and S5L with luminous period ratio of T1L:T2L:T3L:T4L:T5L=20:20:20:20:20 where T0=T1L+T2L+T3L+T4L+T5L. Simultaneously, the drive voltage driver 5L is operated in synchronization with the time-divisional switching of the reference voltage lines S1L, S2L, S3L, S4L and S5L. That is, the drive voltage driver 5L is driven by the voltage at the reference voltage line S1L, so that the drive voltage driver 5L generates pulse-shaped luminous drive voltages A1, A2, A3 and A4 defined by their on-duty ratios for the first row during the luminous period T1L, i.e., voltage at L1=A1
voltage at L2=A2
voltage at L3=A3
voltage at L4=A4.

Also, the drive voltage driver 5L is driven by the voltage at the reference voltage line S2L, so that the drive voltage driver 5L generates pulse-shaped luminous drive voltages B1, B2, B3 and B4 defined by their on-duty ratios for the second row during the luminous period T2L, i.e., voltage at L1=B1
voltage at L2=B2
voltage at L3=B3
voltage at L4=B4.

Further, the drive voltage driver 5L is driven by the voltage at the reference voltage line S3L, so that the drive voltage driver 5L generates pulse-shaped luminous drive voltages C1, C2, C3 and C4 defined by their on-duty ratios for the third row during the luminous period T3L, i.e., voltage at L1=C1
voltage at L2=C2
voltage at L3=C3
voltage at L4=C4.

Furthermore, the drive voltage driver 5L is driven by the voltage at the reference voltage line S4L, so that the drive voltage driver 5L generates pulse-shaped luminous drive voltages D1, D2, D3 and D4 defined by their on-duty ratios for the fourth row during the luminous period T4L, i.e., voltage at L1=D1
voltage at L2=D2
voltage at L3=D3
voltage at L4=D4.

Still further, the drive voltage driver 5L is driven by the voltage at the reference voltage line S5L, so that the drive voltage driver 5L generates pulse-shaped luminous drive voltages E1, E2, E3 and E4 defined by their on-duty ratios for the fifth row during the luminous period T5L, i.e., voltage at L1=E1
voltage at L2=E2
voltage at L3=E3
voltage at L4=E4.

Thus, the LED elements $P_{1,1}, P_{1,2}, P_{1,3}, P_{1,4}$ for the first row, the LED elements $P_{2,1}, P_{2,2}, P_{2,3}, P_{2,4}$ for the second row, the LED elements $P_{3,1}, P_{3,2}, P_{3,3}, P_{3,4}$ for the third row, the LED elements $P_{4,1}, P_{4,2}, P_{4,3}, P_{4,4}$ for the fourth row, and the LED elements $P_{5,1}, P_{5,2}, P_{5,3}, P_{5,4}$ for the fifth row are time-divisionally driven by a dynamic driving method.

In FIG. 17B, the maximum luminous intensity of each of the LED elements $P_{1,1}, P_{1,2}, P_{1,3}, P_{1,4}$ for the first row is 20 (=100×0.2). Therefore, the luminous intensities of the LED elements $P_{1,1}, P_{1,2}, P_{1,3}, P_{1,4}$ are ranged from 0 (dark) to 20 in accordance with the on-duty ratios of the luminous drive voltages A1, A2, A3, A4. The maximum luminous intensity of each of the LED elements $P_{2,1}, P_{2,2}, P_{2,3}, P_{2,4}$ for the second row is 20 (=100×0.2). Therefore, the luminous intensities of the LED elements $P_{2,1}, P_{2,2}, P_{2,3}, P_{2,4}$ are ranged from 0 (dark) to 20 in accordance with the on-duty ratios of the luminous drive voltages B1, B2, B3, B4. The maximum luminous intensity of each of the LED elements $P_{3,1}, P_{3,2}, P_{3,3}, P_{3,4}$ for the third row is 20 (=100×0.2). Therefore, the luminous intensities of the LED elements $P_{3,1}, P_{3,2}, P_{3,3}, P_{3,4}$ are ranged from 0 (dark) to 20 in accordance with the on-duty ratios of the luminous drive voltages C1, C2, C3, C4. The maximum luminous intensity of each of the LED elements $P_{4,1}, P_{4,2}, P_{4,3}, P_{4,4}$ for the fourth row is 20 (=100×0.2). Therefore, the luminous intensities of the LED elements $P_{4,1}, P_{4,2}, P_{4,3}, P_{4,4}$ are ranged from 0 (dark) to 20 in accordance with the on-duty ratios of the luminous drive voltages D1, D2, D3, D4. The maximum luminous intensity of each of the LED elements $P_{5,1}, P_{5,2}, P_{5,3}, P_{5,4}$ for the fifth row is 20 (=100×0.2). Therefore, the luminous intensities of the LED elements $P_{5,1}, P_{5,2}, P_{5,3}, P_{5,4}$ are ranged from 0 (dark) to 20 in accordance with the on-duty ratios of the luminous drive voltages E1, E2, E3, E4.

The right-side LED portion 1R is explained next in detail.

The cathode electrodes of the LED elements $P_{1,17}, P_{1,18}, P_{1,19}, P_{1,20}; P_{2,17}, P_{2,18}, P_{2,19}, P_{2,20}; \ldots;$ and $P_{5,17}, P_{5,18}, P_{5,19}, P_{5,20}$ are connected to reference voltage lines S1R, S2R, S3R, S4R and S5R, respectively. On the other hand, the anode electrodes of the LED elements $P_{1,17}, P_{2,17}, P_{3,17}, P_{4,17}, P_{5,17}; P_{1,18}, P_{2,18}, P_{3,18}, P_{4,18}; P_{1,19}, P_{2,19}, P_{3,19}, P_{4,19}; P_{1,20}, P_{2,20}, P_{3,20}, P_{4,20}$ are connected to drive voltage lines R1, R2, R3, R4, respectively. A reference voltage driver 2R supplies reference voltages such as the ground voltage GND to the reference voltage lines S1R, S2R, S3R, S4R and S5R, while a drive voltage driver 5R supplies luminous drive voltages to the drive voltage lines R1, R2, R3 and R4.

The reference voltage driver 2R is a multiplexing switching circuit which time-divisionally activates or switches the reference voltage lines S1R, S2R, S3R, S4R and S5R with luminous period ratio of T1R:T2R:T3R:T4R:T5R=20:20:20:20:20 where T0=T1R+T2R+T3R+T4R+T5R. Simultaneously, the drive voltage driver 5R is operated in synchronization with the time-divisional switching of the reference voltage lines S1R, S2R, S3R, S4R and S5R. That is, the drive voltage driver 5R is driven by the voltage at the reference voltage line S1R, so that the drive voltage driver 5R generates pulse-shaped luminous drive voltages A17, A18, A19 and A20 defined by their on-duty ratios for the first row during the luminous period T1R, i.e., voltage at R17=A17
voltage at R18=A18
voltage at R19=A19
voltage at R20=A20.

Also, the drive voltage driver 5R is driven by the voltage at the reference voltage line S2R, so that the drive voltage driver 5R generates pulse-shaped luminous drive voltages B17, B18, B19 and B20 defined by their on-duty ratios for the second row during the luminous period T2R, i.e., voltage at R17=B17
voltage at R18=B18
voltage at R19=B19
voltage at R20=B20

Further, the drive voltage driver 5R is driven by the voltage at the reference voltage line S3R, so that the drive voltage driver 5R generates pulse-shaped luminous drive voltages C17, C18, C19 and C20 defined by their on-duty ratios for the third row during the luminous period T3R, i.e., voltage at R17=C17
voltage at R18=C18
voltage at R19=C19
voltage at R20=C20.

Furthermore, the drive voltage driver 5R is driven by the voltage at the reference voltage line S4R, so that the drive voltage driver 5R generates pulse-shaped luminous drive voltages D17, D18, D19 and D20 defined by their on-duty ratios for the fourth row during the luminous period T4R, i.e., voltage at R17=D17
voltage at R18=D18
voltage at R19=D19
voltage at R20=D20.

Still further, the drive voltage driver 5R is driven by the voltage at the reference voltage line S5R, so that the drive voltage driver 5R generates pulse-shaped luminous drive voltages E17, E18, E19 and E20 defined by their on-duty ratios for the fifth row during the luminous period T5R, i.e., voltage at R17=E17
voltage at R18=E18
voltage at R19=E19
voltage at R20=E20.

Thus, the LED elements $P_{1,17}, P_{1,18}, P_{1,19}, P_{1,20}$ for the first row, the LED elements $P_{2,17}, P_{2,18}, P_{2,19}, P_{2,20}$ for the second the LED elements $P_{4,17}, P_{4,18}, P_{4,19}, P_{4,20}$ for the fourth row, and the LED elements $P_{5,17}, P_{5,18}, P_{5,10}, P_{5,20}$ for the fifth row are time-divisionally driven by a dynamic driving method.

In FIG. 17B, the maximum luminous intensity of each of the LED elements $P_{1,17}, P_{1,18}, P_{1,19}, P_{1,20}$ for the first row is 20 (=100×0.2). Therefore, the luminous intensities of the LED elements $P_{1,17}, P_{1,18}, P_{1,19}, P_{1,20}$ are ranged from 0 (dark) to 20 in accordance with the on-duty ratios of the luminous drive voltages A17, A18, A19, A20. The maximum luminous intensity of each of the LED elements $P_{2,17}, P_{2,18}, P_{2,19}, P_{2,20}$ for the second row is 20 (=100×0.2). Therefore, the luminous intensities of the LED elements $P_{2,17}, P_{2,18}, P_{2,19}, P_{2,20}$ are ranged from 0 (dark) to 20 in accordance with the on-duty ratios of the luminous drive voltages B17, B18, B19, B20. The maximum luminous intensity of each of the LED elements $P_{3,17}, P_{3,18}, P_{3,19}, P_{3,20}$ for the third row is 20 (=100×0.2). Therefore, the luminous intensities of the LED elements $P_{3,17}, P_{3,18}, P_{3,19}, P_{3,20}$ are ranged from 0 (dark) to 20 in accordance with the on-duty ratios of the luminous drive voltages C17, C18, C19, C20. The maximum luminous intensity of each of the LED elements $P_{4,17}, P_{4,18}, P_{4,19}, P_{4,20}$ for the fourth row is 20 (=100×0.2). Therefore, the luminous intensities of the LED elements $P_{4,17}, P_{4,18}, P_{4,19}, P_{4,20}$ are ranged from 0 (dark) to 20 in accordance with the on-duty ratios of the luminous drive voltages D17, D18, D19, D20. The maximum luminous intensity of each of the LED elements $P_{5,17}, P_{5,18}, P_{5,19}, P_{5,20}$ for the fifth row is 20 (=100×0.2). Therefore, the luminous intensities of the LED elements $P_{5,17}, P_{5,18}, P_{5,19}, P_{5,20}$ are ranged from 0 (dark) to 20 in accordance with the on-duty ratios of the luminous drive voltages E17, E18, E19, E20.

Thus, according to the lightening apparatus of FIGS. 17A and 17B, in the left-side LED portion 1L and the right-side LED portion 1R, the luminous intensities of the LED elements are made uniformly low.

In FIG. 17A, note that the operation of the reference voltage driver 2L can be synchronized with that of the reference voltage driver 2R. In this case, one of the reference voltage drivers 2L and 2R can be omitted.

Figure 18A:
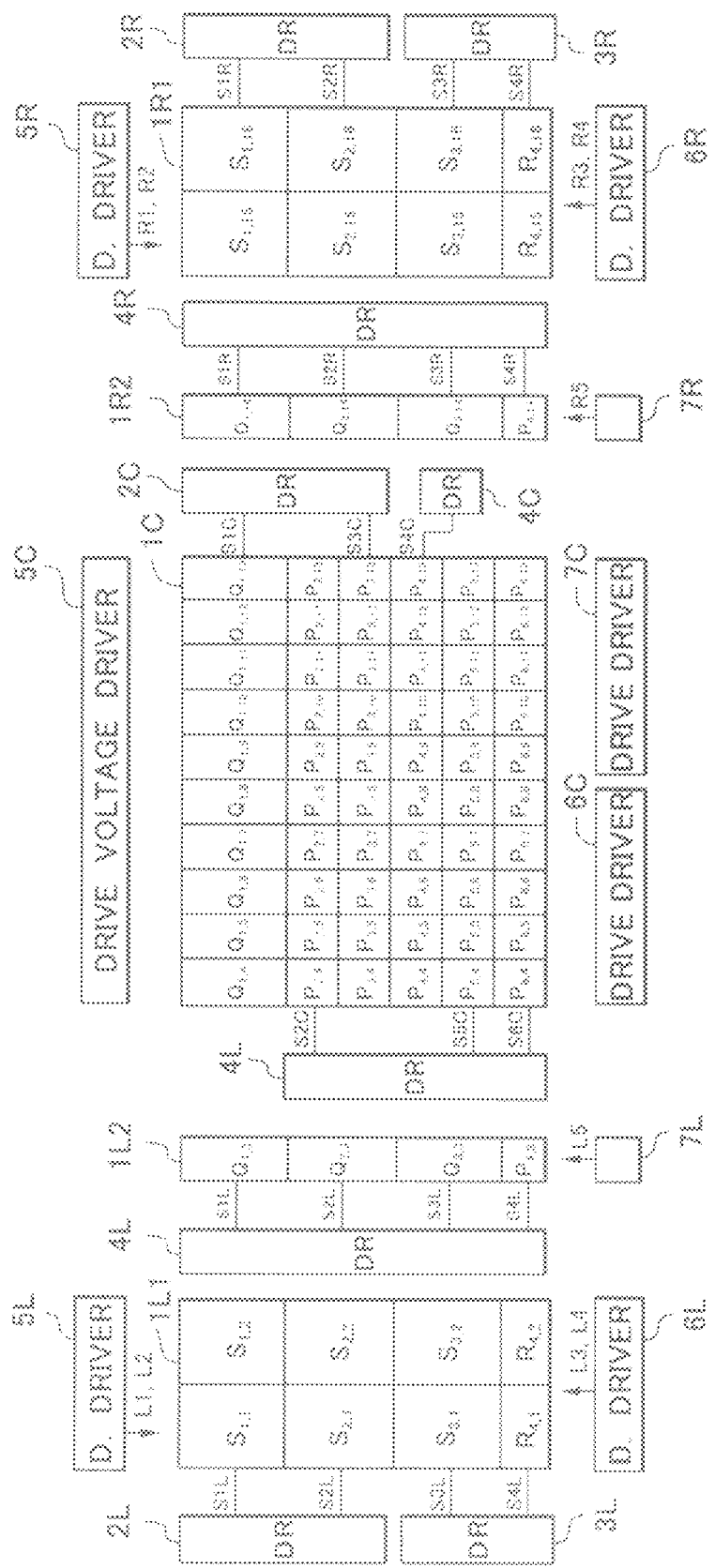
FIG. 18A is a block circuit diagram illustrating a sixth embodiment of the lightening apparatus according to the presently disclosed subject matter.
Figure 18B:
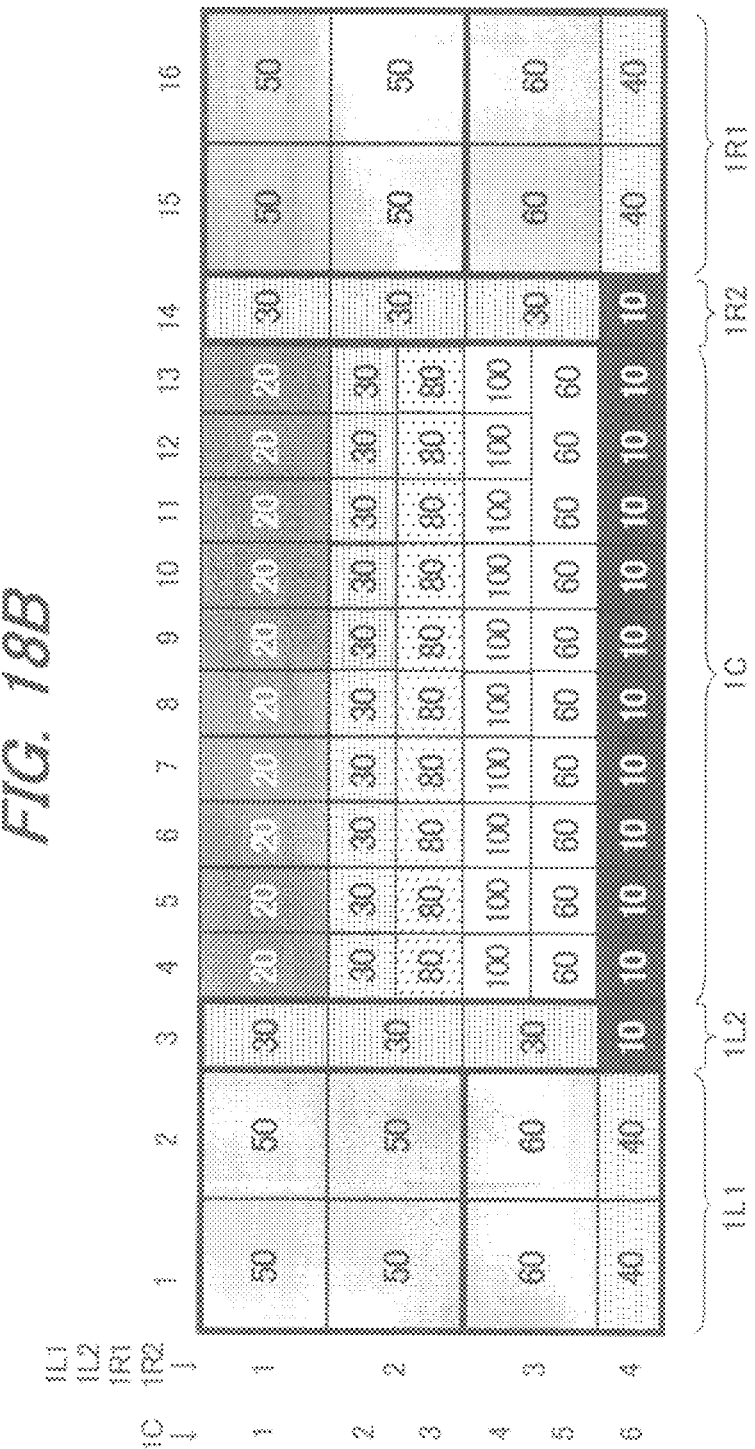
FIG. 18B is a diagram for explaining the maximum luminous intensities of the LED elements of FIG. 18A.

FIG. 18A is a block circuit diagram illustrating a sixth embodiment of the lightening apparatus according to the presently disclosed subject matter, and FIG. 18B is a diagram for explaining the maximum luminous intensities of the LED elements of FIG. 18A.

In FIG. 18A, an LED panel 1 is divided into a center-side LED portion 1C formed by LED elements $Q_{1,4}$, $Q_{1,5}, \ldots, Q_{1,13}$; $Q_{2,4}, Q_{2,5}, \ldots, Q_{2,13}$; $\ldots$; $Q_{6,4}$, $Q_{6,5}, \ldots, Q_{6,13}$, an outer left-side LED portion 1L1 formed by LED elements $S_{1,1}, S_{1,2}$; $S_{2,1}, S_{2,2}, S_{3,1}, S_{3,2}$ and $R_{4,1}, R_{4,2}$, an inner left-side LED portion 1L2 formed by LED elements $Q_{1,3}, Q_{2,3}, Q_{3,3}$ and $P_{4,3}$, an outer right-side LED portion 1R1 formed by LED elements $S_{1,15}, S_{1,15}$, $S_{2,15}, S_{2,16}$; $S_{3,15}, S_{3,16}$ and $R_{4,15}, R_{4,10}$ an inner right-side LED portion 1R2 formed by LED elements $Q_{1,14}, Q_{2,14}$, $Q_{3,14}$ and $P_{4,14}$.

In FIG. 18A, each of the LED elements $Q_1, Q_{1,4}, \ldots$, $Q_{1,14}$; $Q_{2,3}, Q_{2,14}$; $Q_{3,3}, Q_{3,14}$ has a longitudinal size twice that of the LED elements $P_{2,4}, P_{2,5}, \ldots, P_{2,13}$; $P_{3,4}$, $P_{3,5}, \ldots, P_{3,13}$; $P_{4,4}, P_{4,5}, \ldots, P_{4,13}$; $P_{5,4}, P_{5,5}, \ldots$, $P_{5,13}$; $P_{6,4}, P_{6,5}, \ldots, P_{6,13}$; $P_{4,3}$ and $P_{4,14}$, while each of the LED elements $R_{4,1}, R_{4,2}, R_{4,15}$ and $R_{4,15}$ have a traverse size twice that of the abovementioned LED elements $P_{2,4}, P_{2,5}, \ldots, P_{2,13}$ and the like. Therefore, the area of each of the LED elements $Q_{1,3}, Q_{1,4}, \ldots$ and the LED elements $R_{4,1}, R_{4,2}, \ldots$ is twice that of each of the LED elements $P_{2,4}, P_{2,5}, \ldots$.

The center-side LED portion 1C is also obtained by reducing the LED panel 1 of FIG. 7A. That is, the center-side LED portion 1C can be operated by reference voltage drivers 2C, 3C and 4C similar to the reference voltage drivers 2, 3 and 4, respectively, of FIG. 7A, and drive voltage drivers 5C, 6C and 7C similar to the drive voltage drivers 5, 6 and 7, respectively, of FIG. 7A. Therefore, the description on the operation of the center-side LED portion 1C is omitted.

Also, each of the LED elements $S_{1,1}, S_{1,2}, S_{1,15}, S_{1,16}$; $S_{2,1}, S_{2,2}, S_{2,15}, S_{2,16}$; $S_{3,1}, S_{3,2}, S_{3,15}, S_{3,15}$ has a longitudinal size twice those of the abovementioned LED elements $P_{2,4}, P_{2,5}, \ldots$ and a traverse size twice those of the abovementioned LED elements $P_{2,4}, P_{2,5}, \ldots, P_{2,13}$ and the like. Therefore, the area of each of the LED elements $S_{1,1} S_{1,2}, \ldots$ is four times that of each of the LED elements $P_{2,4}, P_{2,5}, \ldots$.

The outer left-side LED portion 1L1 is explained next in detail.

The cathode electrodes of the LED elements $S_{1,1}$ and $S_{1,2}$ are connected to a reference voltage line S1L, and the cathode electrodes of the LED elements $S_{2,1}$ and $S_{2,2}$ are connected to a reference voltage line S2L. The reference voltage lines S1L and S2L are time-divisionally activated by a reference voltage driver 2L with a luminous period ratio of 50:50. On the other hand, the anode electrodes of the LED elements $S_{1,1}, S_{2,1}$ and $S_{1,2}, S_{2,2}$ are connected to drive voltage lines L1 and L2, respectively, which are driven by a drive voltage driver 5L. Thus, the LED elements $S_{1,1}$ and $S_{1,2}$ for the first row and the LED elements $S_{2,1}$ and $S_{2,2}$ for the second row are time-divisionally driven by a dynamic driving method.

The cathode electrodes of the LED elements $S_{3,1}$ and $S_{3,2}$ are connected to a reference voltage line S3L, and the cathode electrodes of the LED elements $S_{4,1}$ and $S_{4,2}$ are connected to a reference voltage line S4L. The reference voltage lines S3L and S4L are time-divisionally activated by a reference voltage driver 3L with a luminous period ratio of 60:40. On the other hand, the anode electrodes of the LED elements $S_{3,1}, S_{4,1}$ and $S_{3,2}, S_{4,2}$ are connected to drive voltage lines L3 and L4, respectively, which are driven by a drive voltage driver 6L. Thus, the LED elements $S_{3,1}$ and $S_{3,2}$ for the third row and the LED elements $S_{4,1}$ and $S_{4,2}$ for the fourth row are time-divisionally driven by a dynamic driving method.

The inner left-side LED portion 1L2 is explained next in detail.

The cathode electrodes of the LED elements $Q_{1,2}, Q_{2,3}$, $Q_{2,2}$ and $P_{4,2}$ are connected to reference voltage line SW, S2L', S3L' and S4L', respectively, which are time-divisionally activated by a reference voltage driver 4L with a luminous period ratio of 30:30:30:10. On the other hand, the anode electrodes of the LED elements $Q_{1,2}, Q_{2,3}, Q_{3,3}$ and $P_{4,3}$ are connected to a drive voltage lines L5 which is driven by a drive voltage driver 7L. Thus, the LED elements $Q_{1,3}$, $Q_{2,3}, Q_{3,3}$ and $P_{4,3}$ for the first, second, third and fourth rows are time-divisionally driven by a dynamic driving method.

The outer right-side LED portion 1R1 is explained next in detail.

The cathode electrodes of the LED elements $S_{1,15}$ and $S_{1,16}$ are connected to a reference voltage line S1R, and the cathode electrodes of the LED elements $S_{2,15}$ and $S_{2,16}$ are connected to a reference voltage line S2R. The reference voltage lines S1R and S2R are time-divisionally activated by a reference voltage driver 2R with a luminous period ratio of 50:50. On the other hand, the anode electrodes of the LED elements $S_{1,15}, S_{2,16}$ and $S_{1,15}, S_{2,16}$ are connected to drive voltage lines R1 and R2, respectively, which are driven by a drive voltage driver 5R. Thus, the LED elements $S_{1,15}$ and $S_{1,16}$ for the first row and the LED elements $S_{2,15}$ and $S_{2,16}$ for the second row are time-divisionally driven by a dynamic driving method.

The cathode electrodes of the LED elements $S_{3,15}$ and $S_{3,16}$ are connected to a reference voltage line S3R, and the cathode electrodes of the LED elements $S_{4,15}$ and $S_{4,16}$ are connected to a reference voltage line S4R. The reference voltage lines S3R and S4R are time-divisionally activated by a reference voltage driver 3R with a luminous period ratio of 60:40. On the other hand, the anode electrodes of the LED elements $S_{3,15}, S_{4,15}$ and $S_{3,16}, S_{4,16}$ are connected to drive voltage lines R3 and R4, respectively, which are driven by a drive voltage driver 6R. Thus, the LED elements $S_{3,15}$ and $S_{3,16}$ for the third row and the LED elements $S_{4,15}$ and $S_{4,16}$ for the fourth row are time-divisionally driven by a dynamic driving method.

The inner right-side LED portion 1R2 is explained next in detail.

The cathode electrodes of the LED elements $Q_{1,14}, Q_{2,14}$, $Q_{3,14}$ and $P_{4,14}$ are connected to reference voltage line S1R', S2R', S3R' and S4R', respectively, which are time-divisionally activated by a reference voltage driver 4R with a luminous period ratio of 30:30:30:10. On the other hand, anode electrodes of the LED elements $Q_{1,14}, Q_{2,14}, Q_{3,14}$ and $P_{4,14}$ are connected to a drive voltage lines R5 which is driven by a drive voltage driver 7R. Thus, the LED elements $Q_{1, 14}$, $Q_{2, 14}$, $Q_{3, 14}$ and $P_{4, 14}$ for the first, second, third and fourth rows are time-divisionally driven by a dynamic driving method.

In the left-side LED portions 1L1 and 1L2 and the right-side LED portions 1R1 and 1R2 of FIG. 18B, the maximum luminous intensities of the LED elements $S_{1, 1}$, $S_{1, 2}$, $Q_{1, 3}$, $Q_{1, 14}$, $S_{1, 15}$ and $S_{1, 16}$ for the first row are 50, 50, 30, 30, 50 and 50, respectively. Also, the maximum luminous intensities of the LED elements $S_{2, 1}$, $S_{2, 2}$, $Q_{2, 3}$, $Q_{2, 14}$, $S_{2, 15}$ and $S_{2, 16}$ for the second row are 50, 50, 30, 30, 50 and 50, respectively. Further, the maximum luminous intensities of the LED elements $S_{3, 1}$, $S_{3, 2}$, $Q_{3, 3}$, $Q_{3, 14}$, $S_{3, 15}$ and $S_{3, 16}$ for the third row are 60, 60, 30, 30, 60 and 60, respectively. Furthermore, the maximum luminous intensities of the LED elements $R_{4, 1}$, $R_{4, 2}$, $P_{4, 3}$, $P_{4, 14}$, $R_{4, 16}$ and $R_{4, 16}$ for the fourth row are 40, 40, 10, 10, 40 and 40, respectively.

Thus, according to the sixth embodiment, the LED elements can have different sizes.

In FIG. 18A, note that the operation of the reference voltage driver 2L can be synchronized with that of the reference voltage driver 2R. In this case, one of the reference voltage drivers 2L and 2R can be omitted. Also, the operation of the reference voltage driver 3L can be synchronized with that of the reference voltage driver 3R. In this case, one of the reference voltage drivers 3L and 3R can be omitted. Further, the operation of the reference voltage driver 4L can be synchronized with that of the reference voltage driver 4R. In this case, one of the reference voltage drivers 4L and 4R can be omitted.

In the above-described embodiments, the reference voltage drivers are connected to the cathode electrodes of the LED elements and the drive voltage drivers are connected to the anode electrodes of the LED elements; however, the reference voltage drivers can be connected to the anode electrodes of the LED elements and the drive voltage drivers can be connected to the cathode electrodes of the LED elements. In this case, the reference voltage drivers activate the reference voltage lines by supplying positive voltages such as the power supply voltage $V_{CC}$ thereto, while the on-duty ratio voltage of the drive voltage drivers is the low voltage such as the ground voltage.

Also, in the above-described embodiments, the LED panel is constructed by the LED elements in a 5 rows×20 column matrix or the like; however, the LED panel can be in other matrixes having "m" rows and "n" columns where "m" is an integer larger than 2 and "n" is a positive integer.

Further, in the above-described embodiments, the LED elements can be replaced by organic or inorganic electroluminescence (EL) elements.

Furthermore, the lightening apparatus according to the presently disclosed subject matter can be applied to a vehicle headlamp of a direct-projection type, a reflection type or the like.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A lightening apparatus comprising:
a plurality of light-emitting elements arranged in a matrix having "m" rows, "n" columns where "m" is an integer larger than 2 and "n" is a positive integer;
at least two first reference voltage lines;
"n" first drive voltage lines wherein a first one of said light-emitting elements is located at each intersection between said first reference voltage lines and said first drive voltage lines;
a first reference voltage driver, connected to said first reference voltage lines and adapted to time-divisionally switch said first reference voltage lines;
a first drive voltage driver, connected to said first drive voltage lines and adapted to supply first luminous drive voltages to said first drive voltage lines in synchronization with time-divisional switching of said first reference voltage lines;
at least one second reference voltage line;
"n" second drive voltage lines wherein a second one of said light-emitting elements is located at each intersection between said second reference voltage line and said second drive voltage lines;
a second reference voltage driver connected to said second reference voltage line and adapted to switch said second reference voltage line; and
a second drive voltage driver, connected to said second drive voltage lines and adapted to supply second luminous drive voltages to said second drive voltage lines in synchronization with switching of said second reference voltage line;
a plurality of left-side light-emitting elements provided adjacently on a left-side of said light-emitting elements;
left-side reference voltage lines;
at least one left-side drive voltage line, wherein one of said left-side light-emitting elements is located at each intersection between said left-side reference voltage lines and said left-side drive voltage line;
at least one left-side reference voltage driver, connected to said left-side reference voltage lines and adapted to time-divisionally switch said left-side reference voltage lines;
at least one left-side drive voltage driver, connected to said left-side drive voltage line and adapted to supply left-side luminous drive voltages to said left-side drive voltage line in synchronization with time-divisional switching of said left-side reference voltage lines;
a plurality of right-side light-emitting elements provided adjacently on a right-side of said light-emitting elements;
right-side reference voltage lines;
at least one right-side drive voltage line, wherein one of said right-side light-emitting elements is located at each intersection between said right-side reference voltage lines and said right-side drive voltage line;
a right-side reference voltage driver, connected to said right-side reference voltage lines and adapted to time-divisionally switch said right-side reference voltage lines; and
at least one right-side drive voltage driver, connected to said right-side drive voltage line and adapted to supply right-side luminous drive voltages to said right-side drive voltage line in synchronization with time-divisional switching of said right-side reference voltage lines.

2. The lightening apparatus as set forth in claim 1, wherein at least one of said left-side light-emitting elements and at least one of said right-side light-emitting elements are larger than said light-emitting elements.

* * * * *